(12) United States Patent
Zhang et al.

(10) Patent No.: US 9,368,832 B2
(45) Date of Patent: Jun. 14, 2016

(54) NON-AQUEOUS ELECTROLYTES FOR ELECTROCHEMICAL CELLS

(75) Inventors: Zhengcheng Zhang, Naperville, IL (US); Jian Dong, Sun Prairie, WI (US); Khalil Amine, Oak Brook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 157 days.

(21) Appl. No.: 13/552,219

(22) Filed: Jul. 18, 2012

(65) Prior Publication Data

US 2014/0023932 A1    Jan. 23, 2014

(51) Int. Cl.
*H01M 10/0564* (2010.01)
*H01M 10/052* (2010.01)
*H01M 10/0565* (2010.01)
*H01M 10/0567* (2010.01)
*H01M 10/0569* (2010.01)

(52) U.S. Cl.
CPC ........ *H01M 10/0564* (2013.01); *H01M 10/052* (2013.01); *H01M 10/0565* (2013.01); *H01M 10/0567* (2013.01); *H01M 10/0569* (2013.01); *H01M 2300/0028* (2013.01); *H01M 2300/0082* (2013.01); *Y02E 60/122* (2013.01)

(58) Field of Classification Search
None
See application file for complete search history.

(56) References Cited

U.S. PATENT DOCUMENTS

| 6,416,906 | B1 | 7/2002 | Smith et al. | |
| 8,034,489 | B2 | 10/2011 | Ryu et al. | |
| 2005/0170253 | A1* | 8/2005 | Yoon et al. | 429/307 |
| 2007/0065728 | A1 | 3/2007 | Zhang et al. | |
| 2008/0318136 | A1* | 12/2008 | Amine et al. | 429/341 |

OTHER PUBLICATIONS

Täubert et al. J. Elechtrochem. Soc. 157 (6) A721-A728 (2010).*
U.S. Appl. No. 13/250,442, filed Sep. 30, 2011, Singh, Dileep et al.
Zhang, S.S., "A review on electrolyte additives for lithium-ion batteries," Journal of Power Sources, 162 (2), 2006, pp. 1379-1394.

* cited by examiner

*Primary Examiner* — Carlos Barcena
*Assistant Examiner* — Wojciech Haske
(74) *Attorney, Agent, or Firm* — Foley & Lardner LLP

(57) ABSTRACT

An electrolyte electrochemical device includes an anodic material and an electrolyte, the electrolyte including an organosilicon solvent, a salt, and a hybrid additiving having a first and a second compound, the hybrid additive configured to form a solid electrolyte interphase film on the anodic material upon application of a potential to the electrochemical device.

7 Claims, 5 Drawing Sheets

NON-AQUEOUS ELECTROLYTES FOR ELECTROCHEMICAL CELLS

GOVERNMENT RIGHTS

The United States Government has rights in this invention pursuant to Contract No. DE-AC02-06CH11357 between the United States Government and UChicago Argonne, LLC, representing Argonne National Laboratory.

FIELD

The present technology is generally directed to non-aqueous electrolyte for electrochemical devices. More particularly, the technology relates to an electrolyte with a hybrid electrolyte additive which is useful to suppress the occurrence of degradation, and an electrochemical device having the same.

BACKGROUND

The increased demand for lithium batteries has resulted in research to improve the cycle life and calendar life of these batteries. Conventional lithium ion batteries typically use non-aqueous electrolytes with a lithium salt such as $LiPF_6$ dissolved in carboxylic ester solvents such as ethylene carbonate, diethyl carbonate, dimethyl carbonate, ethyl methyl carbonate, γ-butyrolactone, etc. The electrolytes are then placed in an electrochemical cell using lithium transition metal oxides as the cathode and carbon or graphite as the anode. Such conventional electrolyte solvents are very flammable and volatile, and can be oxidatively cleaved into gaseous products above 4.4V vs $Li/Li^+$. A variety of electrolytes that include silicon-based solvents such as, polysiloxanes and silanes, have been developed to address these issues. However, many secondary batteries that include these solvents exhibit poor capacity and/or cycling performance. There remains a need for a battery that has the safety provided by polysiloxane solvents, but which exhibits acceptable capacity and/or cycling capability.

It is generally accepted that electrolyte composition is one of the decisive factors affecting the efficient and long-term operation of Li-ion batteries, as well as their safety for users. The chemical nature of the electrolyte components affects not only lithium ion transport through the electrolyte, but also the structure and composition of a passive layer (often called the solid electrolyte interphase, or SEI) which forms on the carbon anode upon charging. The industry standard electrolyte is ethylene carbonate (EC), which exhibits excellent SEI forming properties, despite its poor, low-temperature performance. Other potential solvents, while having favorable transport properties, may not necessarily provide satisfactory passivation of graphite. For example, propylene carbonate (PC), has been shown to co-intercalate with lithium cations into the crystal structure of graphite, followed by decomposition of the PC. A number of electrolyte additives have developed to address the co-intercalation problem associated, to enable the use of PC-based electrolytes. Other available solvents, such as silanes may be reduced on the surface of the graphite anode and not compatible with graphite anode for the formation of its own SEI. In order to solve the above problems, the use of additives is one effective solution to improve lifetime, capacity, and low temperature performance of a battery. Nevertheless, common additives such as vinylene carbonates, sulfites, sulfates, and phosphates tend to be costly, and only provide for marginal electrolyte improvement.

SUMMARY

In one aspect, a non-aqueous electrolyte is provided, the electrolyte including a hybrid additive, an aprotic solvent, and a salt. The hybrid additive includes a mixture of at least two compounds, which, during charging of a cell including the electrolyte, are reduced at substantially the same potential to form at least a first and a second reduction product. The potential at which the compounds are decomposed is less than the potential at which the solvent is decomposed, thus preventing solvent decomposition. Upon charging, the first and second reduction products form an integrated and unique SEI, which serves as an efficient protection of a carbon-based anode, thereby providing improved cycling performance and safety compared to a cell without the hybrid additive. The SEI, thus formed, exhibits a synergetic effect on cell performance, that is not observed in a cell with the hybrid additive components individually.

In one aspect, a non-aqueous electrolyte is provided, the electrolyte including a first compound; a second compound; a salt; and a non-aqueous solvent including a silane or siloxane. In the electrolyte, the electrolyte includes about 0.01 wt % to about 5 wt % of the first compound and about 0.01 wt % to about 5 wt % of the second compound. The first compound is represented by Formula I-A, I-B, I-C, I-D or I-E:

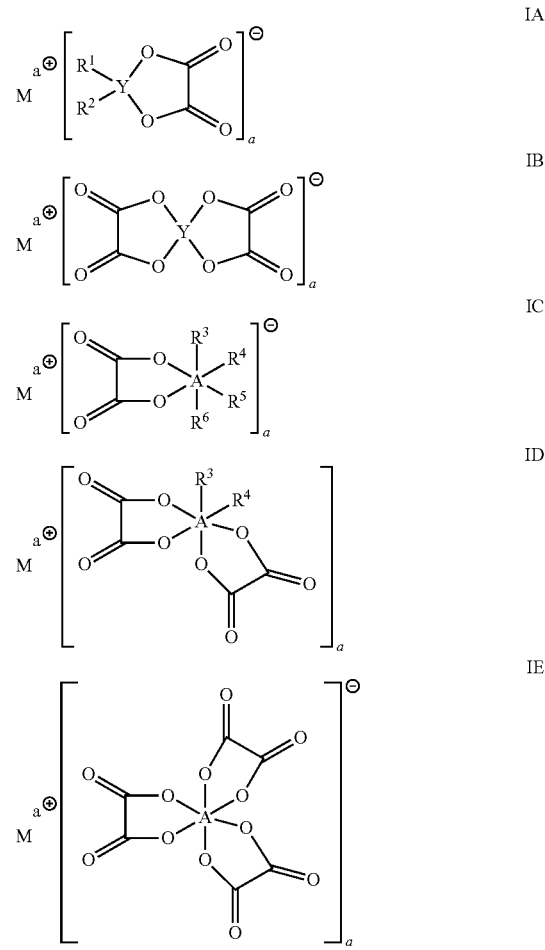

and the second compound is represented by Formula II-A, or II-B:

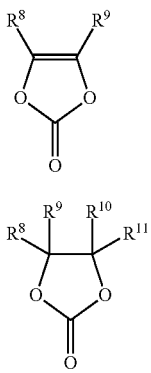

In the above compounds, $R^1$, $R^2$, $R^3$, $R^4$, $R^5$, and $R^6$ are each independently F, Cl, Br, CN, $NO_2$, alkyl, haloalkyl, alkylene, aryl, or haloaryl; $R^8$, $R^9$, $R^{10}$, and $R^{11}$ are each independently selected from H, F, Cl, Br, CN, $NO_2$, alkyl, haloalkyl, alkylene, aryl, or haloaryl; M is a metal ion, an ammonium, a phosphonium, a sulfonium, an imidazolium, a pyridinium, or trityl; a is 1, 2, 3, or 4; Y is B or Al; and A is P or As. The electrolyte may include about 1 wt % to about 3 wt % of the first compound, and about 1 wt % to about 3 wt % of the second compound. In some embodiments, the electrolyte includes about 2 wt % of the first compound, and about 2 wt % of the second compound.

The non-aqueous solvent in the electrolyte may include a monosiloxane, a disiloxane, a trisiloxane, a tetrasiloxane, or a silane. In some embodiments, the solvent includes $Si(CH_3)_3O(CH_2CH_2O)_nCH_3$, $Si(CH_3)_3CH_2O(CH_2CH_2O)_nCH_3$, $Si(CH_3)_3(CH_2)_3O(CH_2CH_2O)_nCH_3$, $Si(CH_3)_2[O(CH_2CH_2O)_nCH_3]_2$, $SiCH_3[O(CH_2CH_2O)_pCH_3]_3$, $Si[O(CH_2CH_2O)_pCH_3]_4$, $Si(CH_3)_2[O(CH_2CH_2O)_nCH_3][(CH_2)_3O(CH_2CH_2O)_nCH_3]$, $(CH_3)_3SiOR$, $(CH_3)_3Si(CH_2)_3OR$; $CH_3O(CH_2CH_2O)_nSi(CH_3)_2OSi(CH_3)_2O(CH_2CH_2O)_nCH_3$, $CH_3O(CH_2CH_2O)_nCH_2Si(CH_3)_2OSi(CH_3)_2CH_2O(CH_2CH_2O)_nCH_3$, $CH_3O(CH_2CH_2O)_n(CH_2)_3Si(CH_3)_2OSi(CH_3)_2(CH_2)_3O(CH_2CH_2O)_nCH_3$, $(CH_3)_3SiOSi(CH_3)_2(CH_2)_3O(CH_3CH_3O)_nCH_3$, $(CH_3)_3SiOSi(CH_3)_2(CH_2)_2O(CH_2CH_2O)_nCH_3$, $(CH_3)_3SiOSi(CH_3)_2O(CH_2CH_2O)_nCH_3$, $(CH_3)_3SiOSi(CH_3)_2OR$; $ROSi(CH_3)_2OSi(CH_3)_2OR$; $(CH_3)_3SiOSi(CH_3)_2(CH_2)_3OR$; $RO(CH_2)_3Si(CH_3)_2OSi(CH_3)_2(CH_2)_3OR$; $CH_3O(CH_2CH_2O)_nSi(CH_3)_2OSi(CH_3)_2OSi(CH_3)_2O(CH_2CH_2O)_nCH_3$, $CH_3O(CH_2CH_2O)_n(CH_2)_3Si(CH_3)_2OSi(CH_3)_2OSi(CH_3)_2(CH_2)_3O(CH_3)_2Si-(OCH_2CH_2)_nOCH_3$, $[(CH_3)_3SiO]_2Si(CH_3)O(CH_2CH_2O)_nCH_3$, $[(CH_3)_3SiO]_2Si(CH_3)(CH_2)_3O(CH_2CH_2O)_nCH_3$, $[(CH_3)_3SiO]_2Si(CH_3)O(CH_2CH_2O)_nSi(CH_3)[OSi(CH_3)_3]_2$, $ROSi(CH_3)_2OSi(CH_3)_2OSi(CH_3)_2OR$, $ROSi(CH_3)_2OSi(CH_3)_2OSi(CH_3)_3$, $RO(CH_2)_3Si(CH_3)_2OSi(CH_3)_2OSi(CH_3)_2(CH_2)_3OR$, $RO(CH_2)_3Si(CH_3)_2OSi(CH_3)_2OSi(CH_3)_3$; $ROSi(CH_3)_2OSi(CH_3)_2OSi(CH_3)_2O(CH_2CH_2)_nCH_3$, or $RO(CH_2)_3Si(CH_3)_2OSi(CH_3)_2O(CH_3)_2Si(CH_2)_3O(CH_2CH_2)_nCH_3$, or a mixture of any two or more such solvents where R is a carbonate group; n is 2, 3, 4, 5, 6, or 7; n' is 2, 3, 4, or 5; p is 2, 3, or 4; and p' is 2 or 3.

In some embodiments, the second compound is a compound of Formula II-B, wherein at least one of $R^8$ and $R^{10}$ is a fluorinated alkyl. For example, where the second compound is a compound of Formula II-B wherein $R^8$ is a fluorinated alkyl or a fluorinated alkoxy; $R^9$ and $R^{10}$ are individually H, F, Cl, $CF_3$ or $CH_3$; and $R^{11}$ is H, F, Cl or an alkyl group. In some embodiments, $R^8$ is a fluorinated $C_1$-$C_8$ alkyl group. In some embodiments, the fluorinated $C_1$-$C_8$ alkyl group is $CF_3$, $CF_3CH_2$, $CF_3CF_2$, $CF_3CH_2CH_2$, $CF_3CF_2CH_2$, $CF_3CF_2CF_2$, $CF_3CH_2CF_2$, $CF_3CH_2CH_2CH_2$, $CF_3CF_2CH_2CH_2$, $CF_3CH_2CF_2CH_2$, $CF_3CF_2CF_2CH_2$, $CF_3CF_2CF_2CF_2$, $CF_3CF_2CH_2CF_2$, $CF_3CH_2CH_2CH_2CH_2$, $CF_3CF_2CH_2CH_2CH_2$, $CF_3CH_2CF_2CH_2CH_2$, $CF_3CF_2CF_2CH_2CH_2$, $CF_3CF_2CF_2CF_2CH_2$, $CF_3CF_2CH_2CF_2CH_2$, $CF_3CF_2CF_2CF_2CH_2CH_2$, $CF_3CF_2CH_2CF_2CH_2CH_2$, $HCF_2$, $HCF_2CH_2$, $HCF_2CF_2$, $HCF_2CH_2CH_2$, $HCF_2CF_2CH_2$, $HCF_2CH_2CF_2$, $HCF_2CF_2CH_2CH_2$, $HCF_2CH_2CF_2CH_2$, $HCF_2CF_2CF_2CF_2$, $HCF_2CF_2CH_2CH_2CH_2$, $HCF_2CH_2CF_2CH_2CH_2$, $HCF_2CF_2CF_2CH_2$, $HCF_2CF_2CF_2CF_2CH_2CH_2$, $FCH_2$, $FCH_2CH_2$, $FCH_2CF_2$, $FCH_2CF_2CH_2$, $FCH_2CF_2CF_2$, $CH_3CF_2CH_2$, $CH_3CF_2CF_2$, $CH_3CH_2CH_2$, $CH_3CF_2CH_2CF_2$, $CH_3CF_2CF_2CF_2$, $CH_3CH_2CF_2CF_2$, $CH_3CF_2CH_2CF_2CH_2$, $CH_3CF_2CF_2CF_2CH_2$, $CH_3CF_2CF_2CH_2CH_2$, $CH_3CH_2CF_2CF_2CH_2$, $CH_3CF_2CH_2CF_2CH_2$, $CH_3CH_2CF_2CF_2CH_2$, $CH_3CF_2CH_2CF_2CH_2CH_2$, $CH_3CF_2CH_2CF_2CH_2CH_2$, $HCFClCF_2CH_2$, $HCF_2CFClCH_2$, $HCF_2CFClCF_2CFClCH_2$ or $HCFClCF_2CFClCH_2CH_2$.

In some embodiments, M is $Li^+$, $Na^+$, $I^+$, $Mg^{2+}$, $Ca^{2+}$, $Ba^{2+}$, $Cs^+$, $Ag^+$, $Zn^{2+}$, $Cu^+$, $Cu^{2+}$, $Co^{2+}$, $Fe^{2+}$, $Fe^{3+}$, $Ni^{2+}$, $Mn^{2+}$, $Ti^{2+}$, $Ti^{3+}$, $Ti^{4+}$, $Pb^{2+}$, $Cr^{3+}$, $V^+$, $V^{2+}m$ $Ru^{2+}$, $Ru^{3+}$, $Y^{3+}$, a lanthanide, an actinide, or a group represented as $[NR^7_4]^+$ wherein each $R^7$ is independently, H, methyl, ethyl, propyl, or butyl. In other embodiments, the first compound is a compound of Formula I-A or I-B; $R^1$ and $R^2$ are each independently F, Cl, Br, CN, $C_1$-$C_6$ alkyl, or $C_1$-$C_6$ haloalkyl; M is $Li^+$, $Na^+$, or $K^+$; and Y is B. In one embodiment, the first compound is $Li[B(C_2O_4)_2]$ and the second compound is vinylene carbonate. In another embodiment, the first compound is $Li[BF_2(C_2O_4)]$ and the second compound is vinylene carbonate.

In another aspect, an electrochemical device is provided including an anodic material; and any of the above electrolytes, where the first and second compounds are configured form a solid electrolyte interphase film on application of a potential to the electrochemical device. The anode of the electrochemical device include graphite, amorphous carbon, $Li_4Ti_5O_{12}$, a tin alloy, a silicon alloy, an intermetallic compound, or lithium metal. In some embodiments, the electrochemical device includes a separator.

In some embodiments, the separator includes a microporous polymer film comprising nylon, cellulose, nitrocellulose, polysulfone, polyacrylonitrile, polyvinylidene fluoride, polypropylene, polyethylene, polybutene, or a blend or copolymer of any two or more thereof. In some embodiments, the separator is an electron beam treated micro-porous polyolefin separator. In other embodiments, the separator is a shut down separator. In various embodiments, the electrochemical device is a secondary battery, a lithium metal battery, a lithium-ion battery, a lithium-sulfur battery, a lithium-air battery, a sodium ion battery, or a magnesium battery. In other embodiments, the electrochemical device is a capacitor such as an asymmetric capacitor or a supercapacitor.

DETAILED DESCRIPTION

Figure 1:
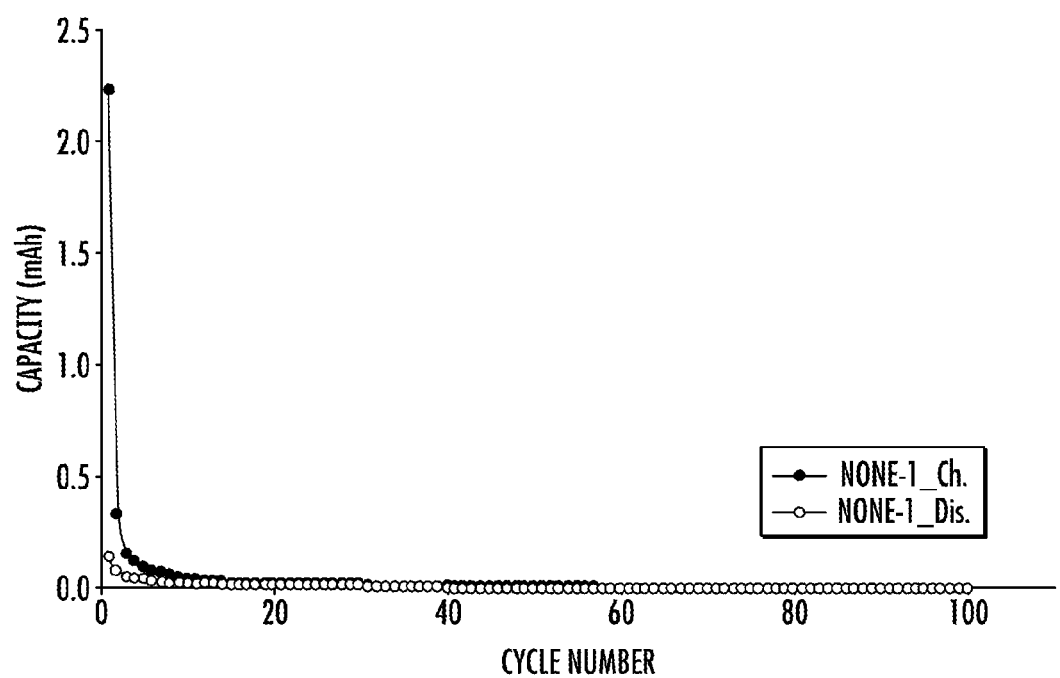
FIG. 1 is a graph of the cycling performance of a 1.0M $LiPF_6$ in 2-[2-[2-[2-methoxy]ethoxy]ethoxy]ethoxy trimethyl silane (1NM3), according to one example.

In general, "substituted" refers to an organic group as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; ethers; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

Alkyl groups, as used herein, include straight chain and branched alkyl groups having from 1 to about 20 carbon atoms, and typically from 1 to 12 carbons or, in some embodiments, from 1 to 8, 1 to 6, or 1 to 4 carbon atoms. Alkyl groups further include cycloalkyl groups as defined below. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups can be unsubstituted or substituted.

Cycloalkyl groups, as used herein, are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 3 to 6, or 3 to 7. Cycloalkyl groups further include mono-, bi- and poly-cyclic ring systems, such as, for example bridged cycloalkyl groups as described below, and fused rings, such as, but not limited to, decalinyl, and the like. In some embodiments, polycyclic cycloalkyl groups have three rings. Substituted cycloalkyl groups can be substituted one or more times with, non-hydrogen and non-carbon groups as defined above. However, substituted cycloalkyl groups also include rings that are substituted with straight or branched chain alkyl groups as defined above. Representative substituted cycloalkyl groups can be mono-substituted or substituted more than once, such as, but not limited to, 2,2-, 2,3-, 2,4-2,5- or 2,6-disubstituted cyclohexyl groups, which can be substituted with substituents such as those listed above. Cycloalkyl groups can also be bridged cycloalkyl groups in which two or more hydrogen atoms are replaced by an alkylene bridge, wherein the bridge can contain 2 to 6 carbon atoms if two hydrogen atoms are located on the same carbon atom, or 1 to 5 carbon atoms, if the two hydrogen atoms are located on adjacent carbon atoms, or 2 to 4 carbon atoms if the two hydrogen atoms are located on carbon atoms separated by 1 or 2 carbon atoms. Bridged cycloalkyl groups can be bicyclic, such as, for example bicyclo[2.1.1]hexane, or tricyclic, such as, for example, adamantyl. Representative bridged cycloalkyl groups include bicyclo[2.1.1]hexyl, bicyclo[2.2.1]heptyl, bicyclo[3.2.1]octyl, bicyclo[2.2.2]octyl, bicyclo[3.2.2]nonyl, bicyclo[3.3.1]nonyl, bicyclo[3.3.2]decanyl, adamantyl, noradamantyl, bornyl, or norbornyl groups. Substituted bridged cycloalkyl groups can be unsubstituted or substituted one or more times with non-hydrogen and non-carbon groups as defined above. Representative substituted bridged cycloalkyl groups can be mono-substituted or substituted more than once, such as, but not limited to, mono-, di- or tri-substituted adamantyl groups, which can be substituted with substituents such as those listed above.

Alkenyl groups, as used herein, include straight and branched chain and cycloalkyl groups as defined above, except that at least one double bond exists between two carbon atoms. Thus, alkenyl groups have from 2 to about 20 carbon atoms, and typically from 2 to 12 carbons or, in some embodiments, from 2 to 8, 2 to 6, or 2 to 4 carbon atoms. In some embodiments, alkenyl groups include cycloalkenyl groups having from 4 to 20 carbon atoms, 5 to 20 carbon atoms, 5 to 10 carbon atoms, or even 5, 6, 7, or 8 carbon atoms. Examples include, but are not limited to vinyl, allyl, —CH═CH(CH$_3$), —CH═C(CH$_3$)$_2$, —C(CH$_3$)═CH$_2$, —C(CH$_3$)═CH(CH$_3$), CH═CHCH═CH$_2$, C(CH$_2$CH$_3$)═CH$_2$, cyclohexenyl, cyclopentenyl, cyclohexadienyl, butadienyl, pentadienyl, and hexadienyl, among others. Alkenyl groups may be substituted or unsubstituted. Representative substituted alkenyl groups can be mono-substituted or substituted more than once, such as, but not limited to, mono-, di- or tri-substituted with substituents such as those listed above.

Alkynyl groups, as used herein, include straight and branched chain alkyl groups, except that at least one triple bond exists between two carbon atoms. Thus, alkynyl groups have from 2 to about 20 carbon atoms, and typically from 2 to 12 carbons or, in some embodiments, from 2 to 8, 2 to 6, or 2 to 4 carbon atoms. Examples include, but are not limited to —C≡CH, —C≡C(CH$_3$), —C≡C(CH$_2$CH$_3$), —CH$_2$CCH, —CH$_2$C≡C(CH$_3$), and —CH$_2$C≡C(CH$_2$CH$_3$), among others. Alkynyl groups may be substituted or unsubstituted. Representative substituted alkynyl groups can be mono-substituted or substituted more than once, such as, but not limited to, mono-, di- or tri-substituted with substituents such as those listed above.

Aryl groups, as used herein, are cyclic aromatic hydrocarbons that do not contain heteroatoms. Aryl groups include monocyclic, bicyclic and polycyclic ring systems. Thus, aryl groups include, but are not limited to, cyclopentadienyl, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 5-14 carbons, and in others from 5 to 12 or even 6-10 carbon atoms in the ring portions of the groups. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups. Aryl groups may be substituted or unsubstituted. Representative substituted aryl groups can be mono-substituted or substituted more than once. For example, monosubstituted aryl groups include, but are not limited to, 2-, 3-, 4-, 5-, or 6-substituted phenyl or naphthyl groups, which can be substituted with substituents such as those listed above.

Alkoxy groups, as used herein, are hydroxyl groups (—OH) in which the bond to the hydrogen atom is replaced by a bond to a carbon atom of a substituted or unsubstituted alkyl group as defined above. Examples of linear alkoxy groups include but are not limited to methoxy, ethoxy, propoxy, butoxy, pentoxy, hexoxy, and the like. Examples of branched alkoxy groups include but are not limited to isopropoxy, sec-butoxy, tert-butoxy, isopentoxy, isohexoxy, and the like. Examples of cycloalkoxy groups include but are not limited to cyclopropyloxy, cyclobutyloxy, cyclopentyloxy, cyclohexyloxy, and the like. Alkoxy groups may be substituted or unsubstituted. Representative substituted alkoxy groups can be substituted one or more times with substituents such as those listed above.

The terms "aryloxy" and "arylalkoxy," as used herein, refer to, respectively, a substituted or unsubstituted aryl group bonded to an oxygen atom and a substituted or unsubstituted aralkyl group bonded to the oxygen atom at the alkyl. Examples include but are not limited to phenoxy, naphthyloxy, and benzyloxy. Representative substituted aryloxy and arylalkoxy groups can be substituted one or more times with substituents such as those listed above.

A hybrid electrolyte additive has been found to significantly improve the cyclability and capacity of lithium ion batteries incorporating a silane or siloxane solvent. The hybrid electrolyte additive, which incorporates a first compound and a second compound, and forms a surface electrode interface (SEI) layer on the surface of an anode that includes carbonaceous anode active materials. The SEI layer not only protects the structure of the carbonaceous material, but it can also can suppress the occurrence of exfoliation during and charging-discharging cycles, thereby providing for an increase in battery lifetime. Moreover, the hybrid additive can enhance the tolerance of the carbonaceous materials in electrolytes, as well as protecting the carbonaceous material with significantly lower loadings of additives than other materials which for SEI layers. The additives are also useful to slow down the decay of capacity on the cathode during charging-discharging cycles, thereby maintaining the performance of electrochemical devices.

The hybrid additives are believed to form an SEI layer on the surface of an electrode, where the SEI layer is more stable than SEI layers formed by silane or siloxane solvents alone. The enhanced stability of the SEI layer increases the capacity and/or cycling properties of batteries incorporating electrolytes which include the hybrid additives. Additionally, hybrid additives reduce the viscosity of the siloxanes and/or silanes in the solvent. The reduced viscosity improves the wetting of the electrodes in the electrochemical device enough to enhance the homogeneity of the electrolyte distribution in the cell. The enhanced homogeneity also increases the capacity and cycling properties of the batteries. The SEI and the reduced viscosity work either independently or together to enhance the capacity and cycling properties of batteries.

In selection of the silane or siloxane solvent for use in the hybrid electrolyte, as well as the selection of the first and second compounds, the potentials at which the various components decompose are taken into account. The potential at which the first and second compounds are decomposed is less than the potential at which the silane or siloxane solvent is decomposed, thereby preventing solvent decomposition. The decomposition of the first and second compounds provides for the formation of the SEI layer.

Accordingly, in one aspect, a non-aqueous electrolyte is provided, the electrolyte including a non-aqueous solvent that is a silane or siloxane, a salt, a first compound and a second compound. The electrolyte includes about 0.01 wt % to about 5 wt % of the first compound and about 0.01 wt % to about 5 wt % of the second compound. The first compound is represented as one of Formulas I-A, I-B, I-C, I-D or I-E, or it may be a mixture of any two or more such compounds:

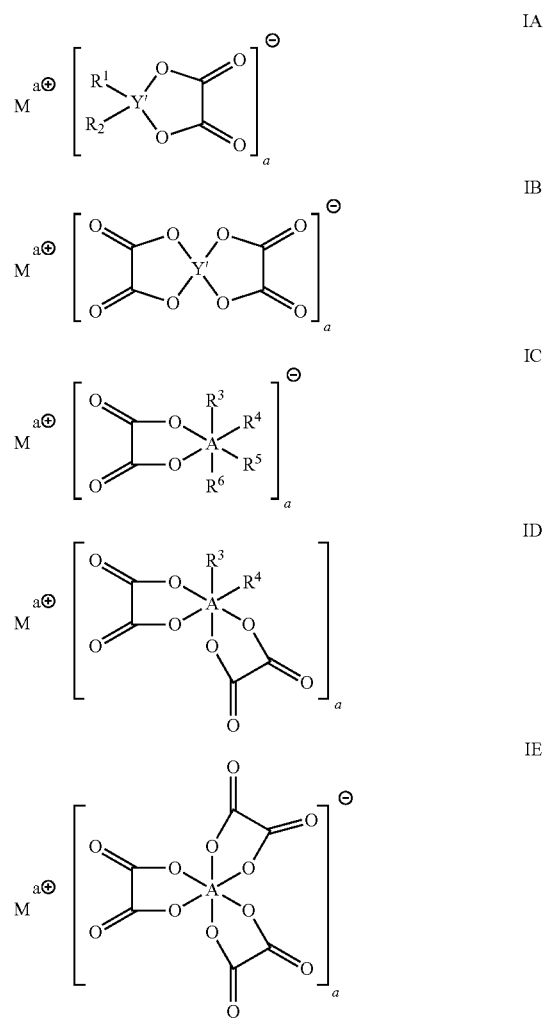

In such compounds, $R^1$, $R^2$, $R^3$, $R^4$, $R^5$, and $R^6$ are each independently F, Cl, Br, CN, $NO_2$, alkyl, haloalkyl, alkylene, aryl, or haloaryl; M is a metal ion, an ammonium, a phosphonium, a sulfonium, an imidazolium, a pyridinium, or trityl; a is 1, 2, 3, or 4; Y' is B or Al; and A is P or As. The second compound of the electrolyte is represented by Formula II-A, or II-B:

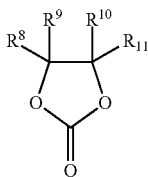

II-B

In such compounds, $R^8$, $R^9$, $R^{10}$, and $R^{11}$ are each independently selected from H, F, Cl, Br, CN, $NO_2$, alkyl, haloalkyl, alkylene, aryl, or haloaryl.

According to some embodiments, the second compound is represented by Formula II-B, wherein at least one of $R^8$ and $R^{10}$ is a fluorinated alkyl. The fluorinated alkyl, in some embodiments is a $C_1$-$C_8$ fluorinated alkyl group. Illustrative examples include, but are not limited to, $CF_3$, $CF_3CH_2$, $CF_3CF_2$, $CF_3CH_2CH_2$, $CF_3CF_2CH_2$, $CF_3CF_2CF_2$, $CF_3CH_2CF_2$, $CF_3CH_2CH_2CH_2$, $CF_3CF_2CH_2CH_2$, $CF_3CH_2CF_2CH_2$, $CF_3CF_2CF_2CH_2$, $CF_3CF_2CF_2CF_2$, $CF_3CF_2CH_2CF_2$, $CF_3CH_2CH_2CH_2CH_2$, $CF_3CF_2CH_2CH_2CH_2$, $CF_3CH_2CF_2CH_2CH_2$, $CF_3CF_2CF_2CH_2CH_2$, $CF_3CF_2CF_2CF_2CH_2$, $CF_3CF_2CH_2CF_2CH_2$, $CF_3CH_2CF_2CH_2CH_2$, $CF_3CF_2CF_2CF_2CH_2CH_2$, $CF_3CF_2CH_2CF_2CH_2CH_2$, $HCF_2$, $HCF_2CH_2$, $HCF_2CF_2$, $HCF_2CH_2CH_2$, $HCF_2CF_2CH_2$, $HCF_2CH_2CF_2$, $HCF_2CF_2CH_2CH_2$, $HCF_2CH_2CF_2CH_2$, $HCF_2CF_2CF_2$, $HCF_2CF_2CH_2CH_2CH_2$, $HCF_2CH_2CF_2CH_2CH_2$, $HCF_2CF_2CF_2CF_2CH_2$, $HCF_2CF_2CF_2CF_2CH_2CH_2$, $FCH_2$, $FCH_2CH_2$, $FCH_2CF_2$, $FCH_2CF_2CH_2$, $FCH_2CF_2CF_2$, $CH_3CF_2CH_2$, $CH_3CF_2CF_2$, $CH_3CH_2CH_2$, $CH_3CF_2CH_2CF_2$, $CH_3CF_2CF_2CF_2$, $CH_3CH_2CF_2CF_2$, $CH_3CF_2CH_2CF_2CH_2$, $CH_3CF_2CF_2CF_2CH_2$, $CH_3CF_2CF_2CH_2CH_2$, $CH_3CH_2CF_2CF_2CH_2$, $CH_3CF_2CH_2CF_2CH_2$, $CH_3CF_2CH_2CF_2CH_2CH_2$, $CH_3CF_2CH_2CF_2CH_2CH_2$, $HCFClCF_2CH_2$, $HCF_2CFClCH_2$, $HCF_2CFClCF_2CFClCH_2$ or $HCFClCF_2CFClCF_2CH_2$.

According to some embodiments, the first compound is a compound of Formula I-A or I-B. In the first compound, $R^1$ and $R^2$ may be independently F, Cl, Br, CN, $C_1$-$C_6$ alkyl, or $C_1$-$C_6$ haloalkyl. In the first compound M may be a metal ion, an ammonium, a phosphonium, a sulfonium, an imidazolium, a pyridinium, or trityl group. Illustrative metals and ammonium ions include, but are not limited to, $Li^+$, $Na^+$, $K^+$, $Mg^{2+}$, $Ca^{2+}$, $Ba^{2+}$, $Cs^+$, $Ag^+$, $Zn^{2+}$, $Cu^+$, $Cu^{2+}$, $Co^{2+}$, $Fe^{2+}$, $Fe^{3+}$, $Ni^{2+}$, $Mn^{2+}$, $Ti^{2+}$, $Ti^{3+}$, $Ti^{4+}$, $Pb^{2+}$, $Cr^{3+}$, $V^+$, $V^{2+}$, $Ru^{2+}$, $Ru^{3+}$, $Y^{3+}$, a lanthanide, an actinide, or a group represented as $[NR^7_4]^+$ wherein each $R^7$ is independently, H, methyl, ethyl, propyl, or butyl. In some embodiments, M is $Li^+$, $Na^+$, or $K^+$. In some embodiments, Y' is B.

According to some embodiments, the second compound is represented by Formula II-B, $R^8$ is a fluorinated alkyl or a fluorinated alkoxy; $R^9$ and $R^{10}$ are individually H, F, Cl, $CF_3$ or $CH_3$; and $R^{11}$ is H, F, Cl or an alkyl group.

In one embodiment, the electrolyte includes a first compound that is $Li[B(C_2O_4)_2]$ and a second compound that is vinylene carbonate. In another embodiment, the electrolyte includes a first compound that is $Li[BF_2(C_2O_4)]$ and a second compound that is vinylene carbonate.

In any of the above embodiments, the electrolyte includes about 1 wt % to about 3 wt % of the first compound, and about 1 wt % to about 3 wt % of the second compound. In any of the above embodiments, the electrolyte includes about 2 wt % of the first compound, and about 2 wt % of the second compound.

In any of the above embodiments of the electrolyte, the non-aqueous solvent may include a silane, or a siloxane that is a monosiloxane, disiloxane, a trisiloxane, a tetrasiloxane, a polysiloxane or a mixture of any two or more such solvents. In some embodiments of the electrolyte, the non-aqueous solvent includes a disiloxane, a trisiloxane, or a tetrasiloxane, or a mixture of any two or more such solvents. Tetrasiloxanes, trisiloxanes and disiloxanes may provide for electrolytes with a lower viscosity than electrolytes that include similarly structured polysiloxanes. The reduced viscosity can further improve wetting of electrodes in an electrochemical device, which enhances the homogeneity of the electrolyte distribution in an electrochemical cell incorporating the electrolyte. Surprisingly, the enhanced homogeneity may be sufficient to increase the capacity and cycling properties of batteries. For instance, when the device is repeatedly cycled between about 2.7 V and 4.0 V, using a charge and discharge rate of 0.1 C after formation of a passivation layer on the anode, the electrolytes provide a secondary battery having a discharge capacity retention greater than 90% at cycle number 200.

As noted above, the non-aqueous solvent may include a silane. Silanes typically have a viscosity that is reduced relative to similarly structured polysiloxanes, tetrasiloxanes, trisiloxanes or disiloxanes. The lower viscosity of the silanes may further improve wetting of electrodes in an electrochemical device enough to further increase the capacity and cycling properties of batteries. For instance, when the device is repeatedly cycled between 2.7 V and 4.0 V using a charge and discharge rate of 0.2 C after formation of a passivation layer on the anode, these electrolytes may provide a secondary battery having a discharge capacity retention greater than 90% at cycle number 400.

The tetrasiloxanes, trisiloxanes, disiloxanes and/or silanes also provide an electrolyte with high ionic conductivities in addition to enhanced cycling properties. For instance, one or more of the silicon atoms in the tetrasiloxanes, trisiloxanes, disiloxanes and/or silanes may be linked to a first substituent that includes a poly(alkylene oxide) moiety. The poly(alkylene oxide) moieties assist in dissolution of lithium salts employed in the electrolyte. Accordingly, the tetrasiloxanes, trisiloxanes, disiloxanes and/or silanes may provide an electrolyte with a concentration of free ions suitable for use in batteries. Additionally, the poly(alkylene oxide) moieties enhance the ionic conductivity of the electrolyte at room temperatures. For instance, silanes having a poly(alkylene oxide) moiety may provide an electrolyte with an ionic conductivity that is greater than $1 \times 10^{-3}$ S/cm at 25° C. In some embodiments, the conductivity is greater than $5 \times 10^{-3}$ S/cm at 37° C. In some embodiments, the conductivity is from about $1 \times 10^{-3}$ S/cm to about $1 \times 10^{-2}$ S/cm at 25° C. At these performance levels, the electrolytes are suitable for use in batteries such as high-energy and long cycle life lithium secondary batteries, satellite applications, and biomedical devices such as defibrillators.

Additionally or alternately, one or more of the silicons in the tetrasiloxanes, trisiloxanes, disiloxanes and/or silanes may be linked to a second substituent that includes a cyclic carbonate moiety. The cyclic carbonate moieties may be capable of dissolving the salts that are employed in battery electrolytes. As a result, the carbonates can provide high concentrations of free ions in the electrolyte, and accordingly, increase the ionic conductivity of the electrolyte. For instance, such silanes with a cyclic carbonate moiety may provide an electrolyte with an ionic conductivity of greater $1 \times 10^{-3}$ S/cm at 25° C., or higher than $5 \times 10^{-3}$ S/cm at 37° C.

According to some embodiments, the siloxanes and/or silanes include one or more oligo(ethylene glycol)-substituted silanes, one or more oligo(ethylene glycol)-substituted disiloxanes, or one or more oligo(ethylene glycol)-substituted trisiloxanes. In some embodiments, the Si atoms in the disiloxanes and trisiloxanes are partially substituted or fully substituted. Such siloxanes or silanes include a silicon or silicon oxide group having four or less substituents that is an oligo(alkylene glycol), or cyclic carbonate moiety. The siloxanes or silanes may be including up to four such substituents. In some embodiments, where the siloxane or silane has less than four such substituents, the siloxane or silane may include substituents other than an oligo(alkylene glycol) or cyclic carbonate moiety. As used herein, a silane has a silicon atom that is bonded to hydrogen and/or carbon atoms, while a siloxane has at least two silicon atoms bonded to oRe oxygen atom.

In one embodiment, the non-aqueous electrolyte solvent includes a silane compound of general Formula IV:

$$SiR^{12}_{4-x-y}R^{13}_{x}R^{14}_{y} \quad \text{Formula IV}$$

In Formula IV, each $R^{12}$ is individually an alkyl, alkenyl group, alkynyl group, alk(poly)enyl group, alk(poly)ynyl group, or aryl group, each of which may further include substituents such as aryl groups, alkoxy groups, or monovalent ether groups. In Formula IV, $R^{13}$ is selected from Group I or Group II, and $R^{14}$ is selected from Group I or Group III. In Formula IV, x is 1, 2, 3, or 4, and y is 0, 1, 2, or 3, where the sum of x and y is greater than or equal to one. Groups I, II, and III are:

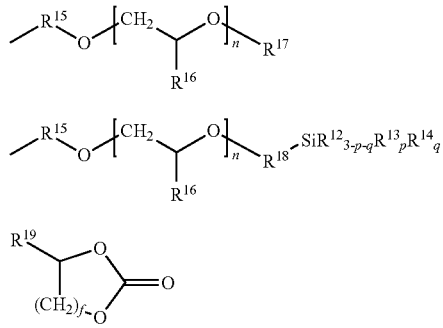

Group I

Group II

Group III where $R^{12}$, $R^{13}$, and $R^{14}$ are as defined above; each $R^{15}$ is individually a bond or a divalent spacer; each $R^{16}$ and $R^{17}$ are individually hydrogen, alkyl, or aryl; each $R^{18}$ is individually alkyl or aryl; each $R^{19}$ is individually a divalent organic spacer; f is 1 or 2; n is an integer from 0 to 15; p is 0, 1, 2, or 3; and q is 0, 1, 2, or 3. In some embodiments, each of $R^{12}$, $R^{13}$, and $R^{14}$ are individually an alkyl group, alkenyl group, alkynyl group, alkoxy group, alk(poly)enyl group, alk(poly)ynyl group, or aryl group, each of which may further include substituents such as aryl groups, alkoxy groups, or monovalent ether groups. In some embodiments, n is an integer from 1 to 15. In other embodiments, $R^{12}$, $R^{13}$, and $R^{14}$ are individually an alkyl, aryl, or alkoxy group.

In some embodiments, a siloxane includes a silicon linked to one side chain that includes an oligo(alkylene glycol) moiety, bonded to the silicon through an oxygen atom, and the silicon is bonded to three other substituents. For instance, the silane can be represented by Formula IV where x is one, y is zero, $R^{13}$ is a Group I, and $R^{12}$ is a bond. In other embodiments, a silane includes a silicon linked to one side chain that includes an oligo(alkylene glycol) moiety, bonded to the silicon through an organic spacer group, and the silicon is bonded to three other substituents. For instance, the silane can be represented by Formula IV, where x is one, y is zero, $R^{13}$ is a Group I, and $R^{15}$ is other than a bond.

Exemplary compounds of Formula IV, include, but are not limited to, Formulas IV-A, IV-B, IV-C, IV-D, IV-E, and IV-F:

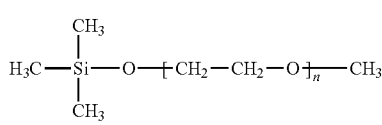

Formula IV-A

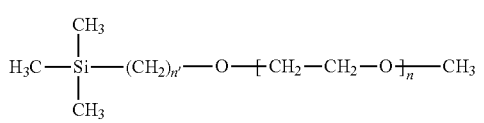

Formula IV-B

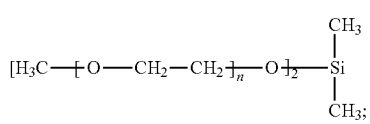

Formula IV-C

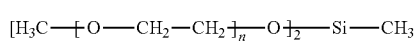

Formula IV-D

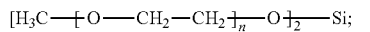

Formula IV-E

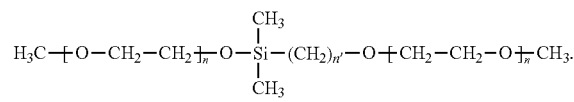

Formula IV-F

In Formulas IV-A, IV-B, IV-C, IV-D, IV-E, and IV-F each n is individually an integer from 1 to 15 (e.g. 1, 2, 3, 4, 5, 6, 7, 8, 9, 10, 11, 12, 13, 14, or 15). In some embodiments, each n is individually an integer from 2 to 15. In some embodiments, n is three. In some embodiments of Formulas IV-A, IV-B, IV-C, IV-D, IV-E, and IV-F, each n' is an integer selected from one, two, or three. In other embodiments, each n' is one or three.

Other exemplary silanes include, but are not limited to those of formula $(CH_3)_3SiO(CH_2CH_2O)_nCH_3$, $(CH_3)_3SiCH_2O(CH_2CH_2O)_nCH_3$, $(CH_3)_3Si(CH_2)_3O(CH_2CH_2O)_nCH_3$, $(CH_3)_2Si[O(CH_2CH_2O)_nCH_3]_2$, $CH_3Si[O(CH_2CH_2O)_pCH_3]_3$, $Si[O(CH_2CH_2O)_pCH_3]_4$, $(CH_3)_2Si[O(CH_2CH_2O)_nCH_3][(CH_2)_3—O—(CH_2CH_2O)_nCH_3]$, $(CH_3)_3SiOR$, $(CH_3)_3Si(CH_2)_3OR$, and mixtures of any two or more such compounds, where R is a carbonate group, n is 2, 3, 4, 5, 6, or 7; n' is 2, 3, 4, or 5; p is 2, 3, or 4; and p' is 2 or 3. Specific examples, include, but are not limited to $(CH_3)_3SiO(CH_2CH_2O)_2CH_3$, $(CH_3)_3SiO(CH_2CH_2O)_3CH_3$, $(CH_3)_3SiO(CH_2CH_2O)_4CH_3$, $(CH_3)_3SiO(CH_2CH_2O)_5CH_3$, $(CH_3)_3SiO(CH_2CH_2O)_6CH_3$, $(CH_3)_3SiO(CH_2CH_2O)_7CH_3$; $(CH_3)_3SiCH_2O(CH_2CH_2O)_2CH_3$, $(CH_3)_3SiCH_2O(CH_2CH_2O)_3CH_3$, $(CH_3)_3SiCH_2O(CH_2CH_2O)_4CH_3$, $(CH_3)_3SiCH_2O(CH_2CH_2O)_5CH_3$, $(CH_3)_3SiCH_2O(CH_2CH_2O)_6CH_3$, $(CH_3)_3SiCH_2O(CH_2CH_2O)_7CH_3$; $(CH_3)_3Si(CH_2)_3O(CH_2CH_2O)_2CH_3$, $(CH_3)_3Si(CH_2)_3O(CH_2CH_2O)_3CH_3$, $(CH_3)_3Si(CH_2)_3O(CH_2CH_2O)_4CH_3$, $(CH_3)_3Si(CH_2)_3O(CH_2CH_2O)_5CH_3$; $(CH_3)_2Si[O(CH_2CH_2O)_2CH_3]_2$, $(CH_3)_2Si[O(CH_2CH_2O)_3CH_3]_2$, $(CH_3)_2Si[O(CH_2CH_2O)_4CH_3]_2$, $(CH_3)_2Si[O(CH_2CH_2O)_5CH_3]_2$; $CH_3Si[O(CH_2CH_2O)_2CH_3]_3$, $CH_3Si[O(CH_2CH_2O)_3CH_3]_3$, $CH_3Si[O(CH_2CH_2O)_4—CH_3]_3$; $Si[O(CH_2CH_2O)_2CH_3]_4$, $Si[O(CH_2CH_2O)_3CH_3]_4$; $(CH_3)_2Si[O(CH_2CH_2O)_2CH_3][(CH_2)_3O(CH_2CH_2O)_2CH_3]$, $(CH_3)_2Si[O(CH_2CH_2O)_3CH_3][(CH_2)_3O $(CH_2CH_2O)_3CH_3]$, $(CH_3)_2Si[O(CH_2CH_2O)_4CH_3][(CH_2)_3O(CH_2CH_2O)_4CH_3]$, or $(CH_3)_2Si[O(CH_2CH_2O)_5CH_3][(CH_2)_3—O—(CH_2CH_2O)_5CH_3]$; and mixtures of any two or more such compounds.

In one embodiment, the non-aqueous electrolyte solvent includes a disiloxane compound. Suitable disiloxanes include a backbone with a first silicon and a second silicon. The first silicon is linked to a first substituent that includes an oligo (alkylene glycol) moiety or a cyclic carbonate moiety. For instance, the first silicon can be selected from a group consisting of a first side-chain that includes an oligo(alkylene glycol) moiety, a first side-chain that includes a cyclic carbonate moiety or a cross-linker that includes a oligo(alkylene glycol) moiety which cross-links the disiloxane to a second siloxane. In some instances, the disiloxanes include no more than one oligo(alkylene glycol) moiety and/or no more than one cyclic carbonate moiety. For instance, the entities linked to the first silicon and the second silicon, other than the first substituent, can each exclude an oligo(alkylene glycol) moiety and/or a cyclic carbonate moiety. In some instances, the disiloxane excludes an oligo(alkylene glycol) moieties or excludes cyclic carbonate moieties. In some embodiments, the inorganic salt is a lithium salt.

The second silicon can be linked to a second substituent that is a second side-chain that includes an oligo(alkylene glycol) moiety and a second side-chain that includes a cyclic carbonate moiety. In some instances, the disiloxanes include no more than two oligo(alkylene glycol) moieties and/or no more than two cyclic carbonate moieties. For instance, the entities linked to the first silicon and the second silicon, in addition to the first substituent and the second substituent, can each include an oligo(alkylene glycol) moiety and/or a cyclic carbonate moiety.

In some embodiments, the disiloxanes are represented by Formula V:

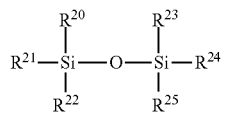

Formula V where $R^{20}$, $R^{22}$, $R^{23}$ and $R^{25}$ are individually an alkyl group or an aryl group; $R^{21}$ is an alkyl group, an aryl group, an oligo (alkylene glycol) group, or an alkylcyclic carbonate group; and $R^{24}$ is an alkyl group, an aryl group, an oligo(alkylene glcycol) group, an alkylcyclic carbonate group, Group I, Group II, or Group III. In some embodiments, $R^{21}$ is selected from Group I, Group II, or Group III. In other embodiments, $R^{24}$ is an alkyl group, an aryl group, Group I, or Group III. In some embodiments, $R^{24}$ is selected from Group I or Group III. In some embodiments, $R^{21}$ is selected from an alkyl group, an aryl group, or Group I. In other embodiments, $R^{21}$ is an alkyl, an aryl, or Group III. In some embodiments, $R^{20}$, $R^{22}$, $R^{23}$, and $R^{25}$ are individually an alkyl group. For example, $R^{20}$, $R^{22}$, $R^{23}$ and $R^{25}$ may individually be a methyl, ethyl, n-propyl, iso-propyl, n-butyl, iso-butyl, or tert-butyl group. In some embodiments, $R^{20}$, $R^{22}$, $R^{23}$, and $R^{25}$ are each a methyl group.

In one example of the disiloxane, the first substituent is a side chain that includes an oligo(alkylene glycol) moiety. The oligo(alkylene glycol) moiety can include an oxygen linked directly to the first silicon. For instance, the disiloxanes can be represented by Formula V, where $R^{24}$ is a Group I, and $R^{15}$ is a bond. Alternately, a spacer can link the oligo(alkylene glycol) moiety to the first silicon. For instance, the disiloxanes can be represented by Formula V, where $R^{24}$ is Group I, and $R^{15}$ is a divalent organic moiety. Where the first substituent is a side chain that includes an oligo(alkylene glycol) moiety, each of the entities linked to the second silicon can be alkyl groups and/or aryl groups. For instance, the second substituent can be an alkyl group or an aryl group. In some embodiments, the disiloxane is a compound of Formula V, where $R^{21}$ is Group I, and $R^{18}$ is an alkyl group or an aryl group.

Exemplary compounds of Formula V, include, but are not limited to:

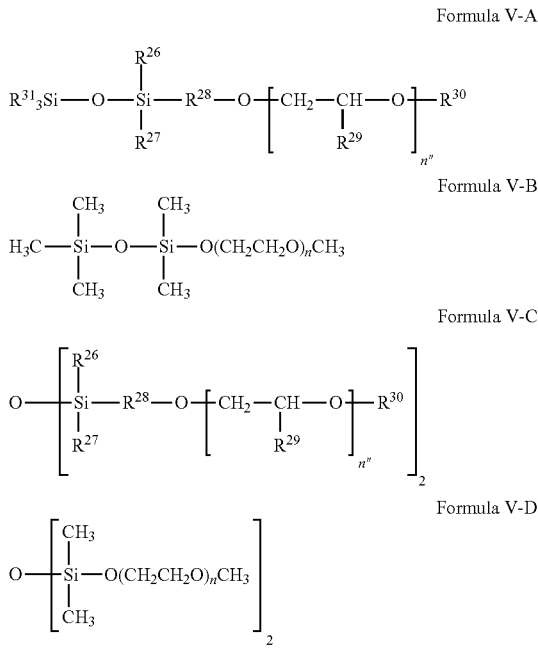

In the above compounds of Formulas V-A, V-B, V-C, and V-D, each $R^{26}$ and $R^{27}$ are individually an alkyl group or an aryl group; each $R^{28}$ is a bond or a divalent spacer; each $R^{29}$ is individually a hydrogen atom or an alkyl group; each $R^{30}$ is individually an alkyl group; each $R^{31}$ is individually an alkyl or an aryl group; n is an integer from 0 to 15, and n" is an integer from 1 to 30. In some embodiments, n is an integer from 1 to 12. Where $R^{28}$ is a divalent spacer, it may be an organic divalent spacer, such as an alkylene, an alkylene glycol, or a bivalent ether group. For example, $R^{28}$ may be a moiety having one or more methylene groups. In some embodiments, $R^{28}$ is methylene, ethylene, propylene, or butylene. In one embodiment, $R^{28}$ is —$(CH_2)_3$—. In some embodiments, $R^{28}$ may be partially or completely halogenated. For instance, the above spacers can be completely or partially fluorinated. In some embodiments, each $R^{31}$ is individually an alkyl group. For example, each $R^{31}$ may individually be a methyl, ethyl, n-propyl, iso-propyl, n-butyl, iso-butyl, or tert-butyl group. In some embodiments, each $R^{31}$ is a methyl group. In one embodiment, each $R^{31}$ is a methyl, $R^{28}$ is —$(CH_2)_3$—; and $R^{29}$ is a hydrogen. In one embodiment, each $R^{31}$ is a methyl; $R^{28}$ is —$(CH_2)_3$—; and $R^{29}$ is a hydrogen; and n is 3. In some embodiments, n is 3.

In some embodiments, the disiloxane compound is a compound of formula $CH_3O(CH_2CH_2O)_nSi(CH_3)_2OSi(CH_3)_2O(CH_3)_2SiO(CH_2CH_2O)_nCH_3$, $CH_3O(CH_2CH_2O)_n(CH_2)_3Si(CH_3)_2OSi(CH_3)_2O(CH_3)_2Si(CH_3)_3O(CH_3)_2Si(OCH_2CH_2)_nOCH_3$, $[(CH_3)_3SiO]_2Si(CH_3)O(CH_2CH_2O)_nCH_3$,

[(CH$_3$)$_3$SiO]$_2$Si(CH$_3$)(CH$_2$)$_3$O(CH$_2$CH$_2$O)$_n$CH$_3$, [(CH$_3$)$_3$SiO]$_2$Si(CH$_3$)O(CH$_2$CH$_2$O)$_n$(CH$_3$)Si[OSi(CH$_3$)$_3$]$_2$, R—OSi(CH$_3$)$_2$OSi(CH$_3$)$_2$O(CH$_3$)$_2$SiO—R, R—OSi(CH$_3$)$_2$OSi(CH$_3$)$_2$OSi(CH$_3$)$_3$, R—O(CH$_2$)$_3$Si(CH$_3$)$_2$OSi(CH$_3$)$_2$O(CH$_3$)$_2$Si(CH$_2$)$_3$OR, R—O(CH$_2$)$_3$Si(CH$_3$)$_2$OSi(CH$_3$)$_2$OSi(CH$_3$)$_3$; R—OSi(CH$_3$)$_2$OSi(CH$_3$)$_2$O(CH$_3$)$_2$SiO(CH$_2$CH$_2$)$_n$CH$_3$, or R—O(CH$_2$)$_3$Si(CH$_3$)$_2$OSi(CH$_3$)$_2$O(CH$_3$)$_2$Si(CH$_2$)$_3$O(CH$_2$CH$_2$)CH$_3$, where n is 2, 3, 4, 5, 6, or 7; and R is a carbonate group. Specific examples may include, but are not limited to CH$_3$O(CH$_2$CH$_2$O)$_2$Si(CH$_3$)$_2$O(CH$_3$)$_2$SiO(CH$_2$CH$_2$O)$_2$CH$_3$, CH$_3$O(CH$_2$CH$_2$O)$_3$Si(CH$_3$)$_2$O(CH$_3$)$_2$SiO(CH$_2$CH$_2$O)$_3$CH$_3$, CH$_3$O(CH$_2$CH$_2$O)$_4$Si(CH$_3$)$_2$O(CH$_3$)$_2$SiO(CH$_2$CH$_2$O)$_4$CH$_3$, CH$_3$O(CH$_2$CH$_2$O)$_5$Si(CH$_3$)$_2$O(CH$_3$)$_2$SiO(CH$_2$CH$_2$O)$_5$CH$_3$, CH$_3$O(CH$_2$CH$_2$O)$_6$Si(CH$_3$)$_2$O(CH$_3$)$_2$SiO(CH$_2$CH$_2$O)$_6$CH$_3$, CH$_3$O(CH$_2$CH$_2$O)$_7$Si(CH$_3$)$_2$O(CH$_3$)$_2$SiO(CH$_2$CH$_2$O)$_7$CH$_3$; CH$_3$O(CH$_2$CH$_2$O)$_2$CH$_2$—Si(CH$_3$)$_2$O(CH$_3$)$_2$Si—CH$_2$O(CH$_2$CH$_2$O)$_2$CH$_3$, CH$_3$O(CH$_2$CH$_2$O)$_3$CH$_2$—Si(CH$_3$)$_3$O(CH$_3$)$_2$Si—CH$_2$O(CH$_2$CH$_2$O)$_3$CH$_3$, CH$_3$O(CH$_2$CH$_2$O)$_4$CH$_2$Si(CH$_3$)$_2$O(CH$_3$)$_2$SiCH$_2$O(CH$_2$CH$_2$O)$_4$CH$_3$, CH$_3$O(CH$_2$CH$_2$O)$_5$CH$_2$Si(CH$_3$)$_2$O(CH$_3$)$_2$SiCH$_2$O(CH$_2$CH$_2$O)$_5$CH$_3$, CH$_3$O(CH$_2$CH$_2$O)$_6$CH$_2$—Si(CH$_3$)$_2$O(CH$_3$)$_2$SiCH$_2$O(CH$_2$CH$_2$O)$_6$CH$_3$, CH$_3$O(CH$_2$CH$_2$O)$_7$CH$_2$Si(CH$_3$)$_2$O(CH$_3$)$_2$Si—CH$_2$O(CH$_2$CH$_2$O)$_7$CH$_3$; CH$_3$O(CH$_2$CH$_2$O)$_2$(CH$_2$)$_3$—Si(CH$_3$)$_2$O(CH$_3$)$_2$Si—(CH$_2$)$_3$O(CH$_2$CH$_2$O)$_2$CH$_3$, CH$_3$O(CH$_2$CH$_2$O)$_3$(CH$_2$)$_3$—Si(CH$_3$)$_2$O(CH$_3$)$_2$Si—(CH$_2$)$_3$O(CH$_2$CH$_2$O)$_3$CH$_3$, CH$_3$O(CH$_2$CH$_2$O)$_4$(CH$_2$)$_3$—Si(CH$_3$)$_2$O(CH$_3$)$_2$Si—(CH$_2$)$_3$O(CH$_2$CH$_2$O)$_4$CH$_3$, CH$_3$O(CH$_2$CH$_2$O)$_5$(CH$_2$)$_3$—Si(CH$_3$)$_2$O(CH$_3$)$_2$Si—(CH$_2$)$_3$O(CH$_2$CH$_2$O)$_5$CH$_3$, CH$_3$O(CH$_2$CH$_2$O)$_6$(CH$_2$)$_3$—Si(CH$_3$)$_2$O(CH$_3$)$_2$Si—(CH$_2$)$_3$O(CH$_2$CH$_2$O)$_6$CH$_3$, CH$_3$O(CH$_2$CH$_2$O)$_7$(CH$_2$)$_3$—Si(CH$_3$)$_2$O(CH$_3$)$_2$Si—(CH$_2$)$_3$O(CH$_2$CH$_2$O)$_7$CH$_3$; (CH$_3$)$_3$SiO(CH$_3$)$_2$SiO(CH$_2$)$_3$O(CH$_2$CH$_2$O)$_2$CH$_3$, (CH$_3$)$_3$SiO(CH$_3$)$_2$SiO(CH$_2$)$_3$O(CH$_2$CH$_2$O)$_3$CH$_3$, (CH$_3$)$_3$SiO(CH$_3$)$_2$SiO(CH$_2$)$_3$O(CH$_2$CH$_2$O)$_4$CH$_3$, (CH$_3$)$_3$SiO(CH$_3$)$_2$SiO(CH$_2$)$_3$O(CH$_2$CH$_2$O)$_5$CH$_3$, (CH$_3$)$_3$SiO(CH$_3$)$_2$SiO(CH$_2$)$_3$O(CH$_2$CH$_2$O)$_6$CH$_3$, (CH$_3$)$_3$SiO(CH$_3$)$_2$SiO(CH$_2$)$_3$O(CH$_2$CH$_2$O)$_7$CH$_3$; (CH$_3$)$_3$SiO(CH$_3$)$_2$SiO(CH$_2$)$_2$O(CH$_2$CH$_2$O)$_2$CH$_3$, (CH$_3$)$_3$SiO(CH$_3$)$_2$SiO(CH$_2$)$_2$O(CH$_2$CH$_2$O)$_3$CH$_3$, (CH$_3$)$_3$SiO(CH$_3$)$_2$SiO(CH$_2$)$_2$O(CH$_2$CH$_2$O)$_4$CH$_3$, (CH$_3$)$_3$SiO(CH$_3$)$_2$SiO(CH$_2$)$_2$O(CH$_2$CH$_2$O)$_5$CH$_3$, (CH$_3$)$_3$SiO(CH$_3$)$_2$SiO(CH$_2$)$_2$O(CH$_2$CH$_2$O)$_6$CH$_3$, (CH$_3$)$_3$SiO(CH$_3$)$_2$SiO(CH$_2$CH$_2$O)$_2$CH$_3$, (CH$_3$)$_3$SiO(CH$_3$)$_2$SiO(CH$_2$CH$_2$O)$_3$CH$_3$, (CH$_3$)$_3$SiO(CH$_3$)$_2$SiO(CH$_2$CH$_2$O)$_4$CH$_3$, (CH$_3$)$_3$SiO(CH$_3$)$_2$SiO(CH$_2$CH$_2$O)$_5$CH$_3$, (CH$_3$)$_3$SiO(CH$_3$)$_2$SiO(CH$_2$CH$_2$O)$_6$CH$_3$, and (CH$_3$)$_3$SiO(CH$_3$)$_2$SiO(CH$_2$CH$_2$O)$_7$CH$_3$, or a mixture of any two or more such compounds.

In some embodiments, the non-aqueous electrolyte solvent includes a trisiloxane compound. Some such trisiloxanes may be represented by general Formula VI:

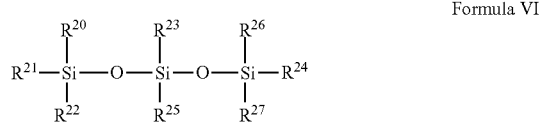

Formula VI where $R^{20}$, $R^{22}$, $R^{23}$, $R^{24}$, $R^{26}$ and $R^{27}$ are individually an alkyl group or an aryl group; $R^{21}$ is an alkyl group, an aryl group, an oligo(alkylene glycol) group, or an alkylcyclic carbonate group; and $R^{24}$ is an alkyl group, an aryl group, an oligo(alkylene glcycol) group, or an alkylcyclic carbonate group. In some embodiments, $R^{21}$ is selected from Group I, Group II, or Group III. In other embodiments, $R^{24}$ is an alkyl group, an aryl group, Group I, or Group III. In some embodiments, $R^{24}$ is selected from Group I or Group III. In some embodiments, $R^{21}$ is selected from an alkyl group, an aryl group, or Group I. In other embodiments, $R^{21}$ is an alkyl, an aryl, or Group III. In some embodiments, $R^{20}$, $R^{22}$, $R^{23}$, $R^{24}$, $R^{26}$ and $R^{27}$ are individually an alkyl group. For example, $R^{20}$, $R^{22}$, $R^{23}$, $R^{24}$, $R^{26}$ and $R^{27}$ may individually be a methyl, ethyl, n-propyl, iso-propyl, n-butyl, iso-butyl, or tert-butyl group. In some embodiments, $R^{20}$, $R^{22}$, $R^{23}$, $R^{24}$, $R^{26}$ and $R^{27}$ are each a methyl group.

Representative trisiloxanes of Formula VI include, but are not limited to, those compounds described by Formulas VI-A, VI-B, VI-C, and VI-D.

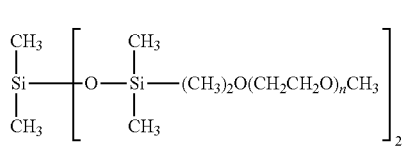

Formula VI-A

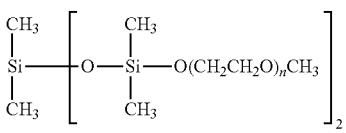

Formula VI-B

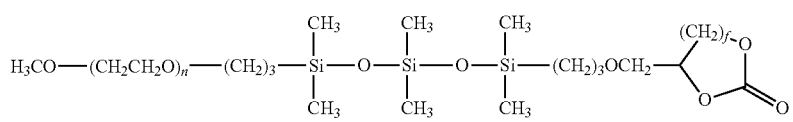

Formula VI-C

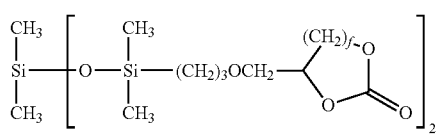

Formula VI-D

In each of the formulas, each n is independently an integer from 1 to 12 and f is 1 or 2.

In each of Formulas VI-A and VI-B, a trisiloxane having terminal silicon atoms linked to a side chain that includes a poly(ethylene oxide) moiety are shown. Formula VI-A illustrates an organic spacer positioned between each poly(ethylene oxide) moiety and the terminal silicon. Formula VI-B illustrates each of the terminal silicon atoms linked directly to a poly(ethylene oxide) moiety. In each of Formulas VI-C and VI-D a trisiloxane with a terminal silicon linked to a side chain that includes a cyclic carbonate moiety are shown. Formula VI-C illustrates one of the terminal silicon atom linked to a side chain that includes a cyclic carbonate moiety and one of the terminal silicon atoms linked to a side chain that includes a poly(ethylene oxide) moiety. Formula VI-D illustrates each of the terminal silicon atoms linked to a side chain that includes a cyclic carbonate moiety.

In other embodiments, the trisiloxanes are compounds according to Formula VII.

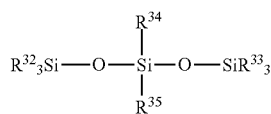

Formula VII where each $R^{32}$, $R^{33}$, and $R^{34}$ are individually an alkyl group or an aryl group; and $R^{35}$ is selected from Group I, Group II, or Group III.

Representative compounds of Formula VII include, but are not limited to compounds such as those of Formulas VII-A, VII-B, VII-C and VII-D.

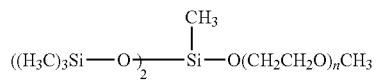

Formula VII-A

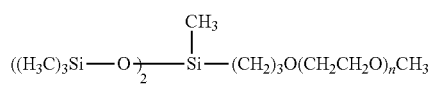

Formula VII-B

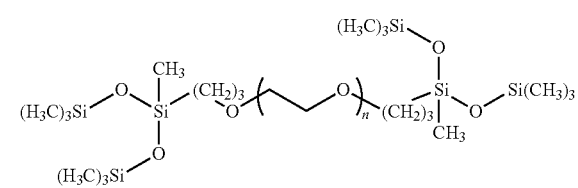

Formula VII-C

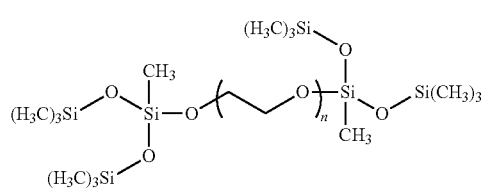

Formula VII-D

In each of the formulas, each n is independently an integer from 1 to 12.

Formula VII-A illustrates a trisiloxane where the central silicon atom is directly linked to a side chain that includes a poly(ethylene oxide). Formulas VII-C and VII-D illustrate trisiloxanes having a central silicon atom linked through a cross-link (e.g. the poly(alkylene oxide) moiety) joining the trisiloxane to a second trisiloxane. Formula VII-C illustrates the cross-link including a spacer positioned between the poly (alkylene oxide) moiety and each of the trisiloxanes. Formula VII-D illustrates a silicon atom in the backbone of each trisiloxane linked directly to a poly(alkylene oxide) moiety. In some embodiments, the trisiloxane is $CH_3O(CH_2CH_2O)_2Si(CH_3)_2OSi(CH_3)_2O(CH_3)_2SiO(CH_2CH_2O)_2CH_3$, $CH_3O(CH_2CH_2O)_3Si(CH_3)_2OSi(CH_3)_2O(CH_3)_2SiO(CH_2CH_2O)_3CH_3$, $CH_3O(CH_2CH_2O)_4Si(CH_3)_2OSi(CH_3)_2O(CH_3)_2SiO(CH_2CH_2O)_4CH_3$, $CH_3O(CH_2CH_2O)_5Si(CH_3)_2OSi(CH_3)_2O(CH_3)_2SiO(CH_2CH_2O)_5CH_3$, $CH_3O(CH_2CH_2O)_6Si(CH_3)_2OSi(CH_3)_2O(CH_3)_2SiO(CH_2CH_2O)_6CH_3$, $CH_3O(CH_2CH_2O)_7Si(CH_3)_2OSi(CH_3)_2O(CH_3)_2SiO(CH_2CH_2O)_7CH_3$; $CH_3O(CH_2CH_2O)_2(CH_2)_3Si(CH_3)_2OSi(CH_3)_2O(CH_3)_2Si(CH_2)_3O(CH_3)_2SiO(CH_2CH_2O)_2CH_3$, $CH_3O(CH_2CH_2O)_3(CH_2)_3Si(CH_3)_2OSi(CH_3)_2O(CH_3)_2Si(CH_2)_3O(CH_3)_2SiO(CH_2CH_2O)_3CH_3$, $CH_3O(CH_2CH_2O)_4(CH_2)_3Si(CH_3)_2OSi(CH_3)_2O(CH_3)_2Si(CH_2)_3O(CH_3)_2SiO(CH_2CH_2O)_4CH_3$, $CH_3O(CH_2CH_2O)_5(CH_2)_3Si(CH_3)_2OSi(CH_3)_2O(CH_3)_2Si(CH_2)_3O(CH_3)_2SiO(CH_2CH_2O)_5CH_3$; $[(CH_3)_3SiO]_2Si(CH_3)O(CH_2CH_2O)_2CH_3$, $[(CH_3)_3SiO]_2Si(CH_3)O(CH_2CH_2O)_3CH_3$, $[(CH_3)_3SiO]_2Si(CH_3)O(CH_2CH_2O)_4CH_3$, $[(CH_3)_3SiO]_2Si(CH_3)O(CH_2CH_2O)_5CH_3$, $[(CH_3)_3SiO]_2Si(CH_3)O(CH_2CH_2O)_6CH_3$, $[(CH_3)_3SiO]_2Si(CH_3)O(CH_2CH_2O)_7CH_3$; $[(CH_3)_3SiO]_2Si(CH_3)(CH_2)_3O(CH_2CH_2O)_2CH_3$, $[(CH_3)_3SiO]_2Si(CH_3)(CH_2)_3O(CH_2CH_2O)_3CH_3$, $[(CH_3)_3SiO]_2Si(CH_3)(CH_2)_3O(CH_2CH_2O)_4CH_3$, $[(CH_3)_3Sio]_2Si(CH_3)(CH_2)_3O(CH_2CH_2O)_5CH_3$, $[(CH_3)_3SiO]_2Si(CH_3)(CH_2)_3O(CH_2CH_2O)_6CH_3$, $[(CH_3)_3SiO]_2Si(CH_3)(CH_2)_3O(CH_2CH_2O)_7CH_3$; $[(CH_3)_3SiO]_2Si(CH_3)O(CH_2CH_2O)_2(CH_3)Si[OSi(CH_3)_3]_2$, $[(CH_3)_3SiO]_2Si(CH_3)O(CH_2CH_2O)_3(CH_3)Si[OSi(CH_3)_3]_2$, $[(CH_3)_3SiO]_2Si(CH_3)O(CH_2CH_2O)_4(CH_3)Si[OSi(CH_3)_3]_2$, $[(CH_3)_3SiO]_2Si(CH_3)O(CH_2CH_2O)_5(CH_3)Si[OSi(CH_3)_3]_2$, $[(CH_3)_3SiO]_2Si(CH_3)O(CH_2CH_2O)_6(CH_3)Si[OSi(CH_3)_3]_2$, $[(CH_3)_3SiO]_2Si(CH_3)O(CH_2CH_2O)_7(CH_3)Si[OSi(CH_3)_3]_2$; R—OSi(CH_3)_2OSi(CH_3)_2O(CH_3)_2SiO—R, R—OSi(CH_3)_2OSi(CH_3)_2OSi(CH_3)_3, R—O(CH_2)_3Si(CH_3)_2OSi(CH_3)_2O(CH_3)_2Si(CH_2)_3O—R, R—O(CH_2)_3Si(CH_3)_2OSi(CH_3)_2OSi(CH_3)_3; R—OSi(CH_3)_2OSi(CH_3)_2O(CH_3)_2SiO(CH_2CH_2)_nCH_3, R—O(CH_2)_3Si(CH_3)_2OSi(CH_3)_2O(CH_3)_2Si(CH_2)_3O(CH_2CH_2)_nCH_3$, or a mixture of any two or more such compounds, where n is 2, 3, 4, 5, 6, or 7, and R is a carbonate group.

To the extent they are not specifically described above, illustrative monosiloxanes include, but are not limited to, $Si(CH_3)_3O(CH_2CH_2O)_nCH_3$, $Si(CH_3)_3CH_2O(CH_2CH_2O)_nCH_3$, $Si(CH_3)_3(CH_2)_3O(CH_2CH_2O)_2CH_3$, $Si(CH_3)_2[O(CH_2CH_2O)_nCH_3]_2$, $SiCH_3[O(CH_2CH_2O)_pCH_3]_3$, $Si[O(CH_2CH_2O)_pCH_3]_4$, $Si(CH_3)_2[O(CH_2CH_2O)_nCH_3][(CH_2)_3O(CH_2CH_2O)_nCH_3]$, $(CH_3)_3SiOR$, or $(CH_3)_3Si(CH_2)_3OR$, R is a carbonate group, n is 2, 3, 4, 5, 6, or 7, n' is 2, 3, 4, or 5, p is 2, 3, or 4; and p' is 2 or 3. To the extent they are not specifically described above, illustrative disiloxanes include, but are not limited to, $CH_3O(CH_2CH_2O)_nSi(CH_3)_2OSi(CH_3)_2O(CH_2CH_2O)_nCH_3$, $CH_3O(CH_2CH_2O)_nCH_2Si(CH_3)_2OSi(CH_3)_2CH_2O(CH_2CH_2O)_nCH_3$, $CH_3O(CH_2CH_2O)_n(CH_2)_3Si(CH_3)_2OSi(CH_3)_2(CH_2)_3O(CH_2CH_2O)_nCH_3$, $(CH_3)_3SiOSi(CH_3)_2(CH_2)_3O(CH_3CH_3O)_nCH_3$, $(CH_3)_3SiOSi(CH_3)_2(CH_2)_2O(CH_2CH_2O)_nCH_3$, $(CH_3)_3SiOSi(CH_3)_2O(CH_2CH_2O)_nCH_3$, $(CH_3)_3SiOSi(CH_3)_2OR$; $ROSi(CH_3)_2OSi(CH_3)_2OR$; $(CH_3)_3SiOSi(CH_3)_2(CH_2)_3OR$; or $RO(CH_2)_3Si(CH_3)_2OSi(CH_3)_2(CH_2)_3OR$, where n is 2, 3, 4, 5, 6, or 7; and R is a carbonate group. To the extent they are not specifically described above, illustrative trisiloxanes include, but are not limited to, $CH_3O(CH_2CH_2O)_nSi(CH_3)_2OSi(CH_3)_2OSi(CH_3)_2O(CH_2CH_2O)_nCH_3$, $CH_3O(CH_2CH_2O)_n(CH_2)_3Si(CH_3)_2OSi(CH_3)_2(CH_2)_3O(CH_3)_2Si—(OCH_2CH_2)_nOCH_3$, $[(CH_3)_3SiO]_2Si(CH_3)O(CH_2CH_2O)_nCH_3$, $[(CH_3)_3SiO]_2Si(CH_3)(CH_2)_3O(CH_2CH_2O)_nCH_3$, $[(CH_3)_3SiO]_2Si(CH_3)O(CH_2CH_2O)_nSi(CH_3)[OSi(CH_3)_3]_2$, $ROSi(CH_3)_2OSi(CH_3)_2OSi(CH_3)_2OR$, $ROSi(CH_3)_2OSi(CH_3)_2OSi(CH_3)_3$; $RO(CH_2)_3Si(CH_3)_2OSi(CH_3)_2OSi(CH_3)_2OSi(CH_3)_2(CH_2)_3OR$, $RO(CH_2)_3Si(CH_3)_2OSi(CH_3)_2OSi(CH_3)_3$; $RO Si(CH_3)_2OSi(CH_3)_2OSi(CH_3)_2O(CH_2CH_2)_nCH_3$ or $RO(CH_2)_3Si(CH_3)_2OSi(CH_3)_2O(CH_3)_2Si(CH_2)_3O(CH_2CH_2)_nCH_3$, where n is 2, 3, 4, 5, 6, or 7; and R is a carbonate group.

In any of the above embodiments of the electrolyte, the salt is a compound of formula $M_a^+X_b^-$; where $M_a^+$ is an electrochemically stable cation; $X_b^-$ is an electrochemical stable anion; a is 1, 2, 3, or 4; and b is 1, 2, 3, or 4. For example, $M_a^+$ may include groups such as, but not limited to, $H^+$, $Li^+$, $Na^+$, $K^+$, $Ca^{2+}$, $Mg^{2+}$, tetraalkylammonium ions, imidazolium ions, or a combination of any two or more thereof, while $X_b^-$ may include groups such as, but not limited to, $[CF_3CO_2]^-$; $[C_2F_5CO_2]^-$; $[ClO_4]^-$; $[BF_4]^-$; $[AsF_6]^-$; $[PF_6]^-$; $[PF_2(C_2O_4)_2]^-$; $[PF_4C_2O_4]^-$; $[CF_3SO_3]^-$; $[N(CF_3SO_2)_2]^-$; $[C(CF_3SO_2)_3]^-$; $[N(SO_2C_2F_5)_2]^-$; an alkyl fluorophosphate; $[B(C_2O_4)_2]^-$; $[BF_2C_2O_4]^-$; $[B_{12}X_{12-k}H_k]^{2-}$; $[B_{10}X_{10-k'}H_{k'}]^{2-}$; or a mixture of any two or more thereof, where X is OH, F, Cl, or Br; k is an integer from 0 to 12; and k' is an integer from 0 to 10. Illustrative salts include, but are not limited to, LiBr, LiI, LiSCN, $LiBF_4$, $LiAlF_4$, $LiPF_6$, $LiAsF_6$, $LiClO_4$, $Li_2SO_4$, $LiB(Ph)_4$, $LiAlO_2$, $Li[N(FSO_2)_2]$, $Li[SO_3CH_3]$, $Li[BF_3(C_2F_5)]$, $Li[PF_3(CF_2CF_3)_3]$, $Li[B(C_2O_4)_2]$, $Li[B(C_2O_4)F_2]$, $Li[PF_4(C_2O_4)]$, $Li[PF_2(C_2O_4)_2]$, $Li[CF_3CO_2]$, $Li[C_2F_5CO_2]$, $Li[N(CF_3SO_2)_2]$, $Li[C(SO_2CF_3)_3]$, $Li[N(C_2F_5SO_2)_2]$, $Li[CF_3SO_3]$, $Li_2B_{12}X_{12-n}H_n$, $Li_2B_{10}X_{10-n'}H_{n'}$, $Li_2S_{x''}$, $(LiS_{x''}R^1)_y$, $(LiSe_{x''}R^1)_y$, or lithium alkyl fluorophosphates; where X is a halogen, n is an integer from 0 to 12, n' is an integer from 0 to 10, x'' is an integer from 1 to 20, y is an integer from 1 to 3, and $R^1$ is H, alkyl, alkenyl, aryl, ether, F, $CF_3$, $COCF_3$, $SO_2CF_3$, or $SO_2F$.

In any of the above electrolytes, the salt is present from about 0.01M to about 1.5 M, from about 0.05 M to about 1.2 M, or from about 0.4 M to about 1.0 M. If the concentration of the ionic electrolyte salt is less than about 0.01M, the ionic conductivity of the resulting non-aqueous electrolyte tends to decrease due to an inadequate number of carrier ions in the electrolyte.

The electrolytes may include other non-aqueous solvents in addition to the silanes and siloxanes described above. Such other non-aqueous solvents may include sulfones, fluorinated solvents, and room temperature ionic liquids (RITLs). Illustrative sulfones include, but are not limited to, those of Formula I

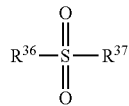

Formula I

In the formula, $R^{36}$ and $R^{37}$ are individually a $C_1$-$C_7$ alkyl group that is unsubstituted, or is substituted with one or more fluorine atoms, or a $C_1$-$C_7$ group having one or more oxygen atoms; or $R^{36}$ and $R^{37}$ join together to form a cyclic alkyl that is unsubstituted or is substituted with one or more fluorine atoms. In some embodiments, the sulfone is a symmetrical sulfone in which $R^{36}$ and $R^{37}$ are identical. For example, where $R^{36}$ and $R^{37}$ are both ethyl, the compound is diethylsulfone: $[(CH_3CH_2)_2SO_2]$. In other embodiments, the sulfone is an asymmetrical sulfone in which $R^1$ and $R^2$ are different. For example, where $R^{36}$ is methyl and $R^{37}$ is ethyl, the compound is ethylmethylsulfone: $[(CH_3CH_2)(CH_3)SO_2]$. In yet other embodiments, the sulfones are cyclic sulfones where $R^{36}$ and $R^{37}$ have joined together. For example, where $R^{36}$ and $R^{37}$ join together as a tetramethylene group, the compound is tetramethylene sulfone, otherwise known as sulfolane. Such sulfones have a high anodic decomposition potential, and can withstand voltage differentials between the anode and cathode of greater than 5 volts vs. lithium. In some embodiments, $R^{36}$ and $R^{37}$ are individually methyl; ethyl; n-propyl; iso-propyl; n-butyl; iso-butyl; sec-butyl; tert-butyl; n-pentyl; iso-pentyl; n-hexyl; n-heptyl; trifluoromethyl; 2,2,2-trifluoroethyl; 1,1-difluoroethyl; perfluoroethyl; 3,3,3-trifluoro-n-propyl; 2,2-difluoro-n-propyl; 1,1-difluoro-n-propyl; 2,2,3,3,3-pentafluoro-n-propyl; 1,1,3,3,3-pentafluoro-n-propyl; perfluoro-n-propyl; perfluoro-n-butyl; perfluoro-n-pentyl; perfluoro-n-hexyl; perfluoro-n-heptyl; —$CH_2OCH_3$; —$CF_2OCH_3$; —$CF_2OCF_3$; —$CH_2CH_2OCH_3$; —$CH_2CF_2OCH_3$; —$CF_2CH_2OCH_3$; —$CF_2CF_2OCH_3$; —$CF_2CF_2OCF_3$; —$CF_2CH_2OCF_3$; —$CH_2CF_2OCF_3$; —$CH_2CH_2OCF_3$; —$CHFCF_2OC$ $F_2H$; —$CF_2CF_2OCF(CF_3)_2$; —$CF_2CH_2OCF(CF_3)_2$; —$CH_2CF_2OCF(CF_3)_2$; —$CH_2CH_2OCF(CF_3)_2$; —$CF_2CF_2OC(CF_3)_3$; —$CF_2CH_2OC(CF_3)_3$; —$CH_2CF_2OC(CF_3)_3$; —$CH_2CH_2OC(CF_3)_3$; —$CH_2CH_2OC$ $H_2CH_3$; —$CH_2CH_2OCH_2CF_3$; —$CH_2CH_2OCF_2CH_3$; —$CH_2CH_2OCF_2CF_3$; —$CH_2CF_2OCH_2CH_3$; —$CH_2CF_2OCF_2CH_3$; —$CH_2CF_2OCH_2CF_3$; —$CH_2CF_2OCF_2CF_3$; —$CF_2CH_2OCH_2CH_3$; —$CF_2CH_2OCF_2CH_3$; —$CF_2CH_2OCH_2CF_3$; —$CF_2CH_2OCF_2CF_3$; —$CF_2CF_2OCH_2CH_3$; —$CF_2CF_2OCF_2CH_3$; —$CF_2CF_2OCH_2CF_3$; —$CF_2CF_2OCF_2CF_3$; —$CF_2CF_2CF_2OCH_3$; —$CF_2CF_2CH_2OCH_3$; —$CF_2CH_2CF_2OCH_3$; —$CH_2CF_2CF_2OCH_3$; —$CH_2CF_2CH_2OCH_3$; —$CH_2CH_2CF_2OCH_3$; —$CH_2CH_2CH_2OCH_3$; —$CH_2CH_2CH_2OCH_3$; —$CF_2CF_2CF_2OCF_3$; —$CF_2CF_2CH_2OCF_3$; —$CF_2CH_2CF_2OCF_3$; —$CH_2CF_2CF_2OCF_3$; —$CH_2CH_2CF_2OCF_3$; —$CH_2CH_2CH_2OCF_3$; —$CF_2CH_2CH_2OCF_3$; —$CH_2CH_2CH_2OCH_3$; —$CH_2CH_2CH_2CH_2OCH_3$; —$CH_2CH_2CH_2CH_2CH_2OCH_3$; —$CH_2CH_2CH_2CH_2CH_2OCH_3$; or —$CH_2CH_2OCH_2CH_2OCH_2CH_2OCH_3$. Alternatively, $R^{36}$ and $R^{37}$ may join together to form a cyclic sulfones. For example, where $R^{36}$ and $R^{37}$ join together as a tetramethylene group, the sulfone is commonly known as sulfolane.

Suitable fluorinated solvents for inclusion in the non-aqueous solvent include, but are not limited to, $[H(CF_2)_2CH_2]_2CO_3$; $HF_2CCF_2CH_2OC(O)OCH_2CF_2CH_2F$; $HF_2CCF_2CH_2OC(O)OCH_2CH_2CF_2CF_2H$; $FH_2CCF_2CH_2OC(O)OCH_2CF_2CF_2H$; $[FCH_2CF_2CH_2]_2CO_3$; $FCH_2CF_2CH_2OC(O)OCH_2CH_2CF_2CF_2H$; $HF_2CCF_2CH_2CH_2OC(O)OCH_2CF_2CF_2H$; $HF_2CCF_2CH_2CH_2OC(O)OCH_2CF_2CH_2F$; $[HF_2CCF_2CH_2CH_2]_2CO_3$; $CF_3CF_2CH_2OC(O)OCH_2CF_2CF_2H$; $CF_3CF_2CH_2OC(O)OCH_2CF_2CH_2F$; $CF_3CF_2CH_2OC(O)OCH_2CH_2CF_2CF_2H$; $CF_3CH_2CH_2OC(O)OCH_2CF_2CF_2H$; $CF_3CH_2CH_2OC(O)OCH_2CF_2CH_2F$; $CF_3CH_2CH_2OC(O)OCH_2CH_2CF_2CF_2H$; $(CF_3)_2CFCH_2CH_2OC(O)OCH_2CF_2CF_2H$; $(CF_3)_2CFCH_2CH_2OC(O)OCH_2CF_2CH_2F$; $(CF_3)_2CFCH_2CH_2OC(O)OCH_2CH_2CF_2CF_2H$; $F_3CCHFCF_2OCH_3$; $F_3CCHFCF_2OCH_2F$; $F_3CCHFCF_2OCF_2H$; $F_3CCHFCF_2OCF_3$; $(CF_3)_2CHCF_2OCH_3$; $(CF_3)_2CHCF_2OCH_2F$; $(CF_3)_2CHCF_2OCHF_2$; $(CF_3)_2CHCF_2OCF_3$; $F_3CFC=CFOCH_3$; $F_3CFC=CFOCH_2F$; $F_3CFC=CFOCHF_2$; $F_3CFC=CFOCF_3$; $F_2C=CFCF_2OCH_3$; $F_2C=CFCF_2OCH_2F$; $F_2C=CFCF_2OCF_2H$; $F_2C=CFCF_2OCF_3$; $(CF_3)_2C=CFOCH_3$; $(CF_3)_2C=CFOCH_2F$; $(CF_3)_2C=CFOCF_2H$; $(CF_3)_2C=CFOCF_3$; $F_2C=C(CF_3)CF_2OCH_3$; $F_2C=C(CF_3)CF_2OCH_2F$; $F_2C=C(CF_3)CF_2OCF_2H$; or $F_2C=C(CF_3)CF_2OCF_3$.

Suitable RITLs for inclusion in the non-aqueous solvent include, but are not limited to, imidazolium, pyridinium, ammonium, or phosphonium materials. For example, suitable imidazoliums include disubstituted imidazoliums, trisubstituted imidazoliums, functionalized imidazoliums, and protonated imidazoliums. Suitable pyridiniums include unsubstituted pyridiniums, substituted pyridiniums, and functionalized pyridiniums. Suitable ammoniums include symmetrical ammoniums, unsymmetrical ammoniums, functionalized ammoniums, protonated ammoniums, and cholines. Suitable phosphoniums include symmetrical phosphoniums and unsymmetrical phosphoniums. The anion of the RTILs may include, but are not limited to, $[CF_3CO_2]^-$; $[C_2F_5CO_2]^-$; $[ClO_4]^-$; $[BF_4]^-$; $[AsF_6]^-$; $[PF_6]^-$; $[PF_2(C_2O_4)_2]^-$; $[PF_4C_2O_4]^-$; $[CF_3SO_3]^-$; $[N(CF_3SO_2)_2]^-$; $[C(CF_3SO_2)_3]^-$; $[N(SO_2C_2F_5)_2]^-$; alkyl fluorophosphates; $[B(C_2O_4)_2]^-$; $[BF_2C_2O_4]^-$; $[B_{12}X_{12-k}H_k]^{2-}$; $[B_{10}X_{10-k'}H_{k'}]^{2-}$; or a combination of any two or more thereof.

The electrolyte may be a liquid, a gel, or a solid. For instance, the electrolyte can include a porous phase that absorbs a liquid electrolyte. The porous phase can provide the structure needed for the electrolyte to be a gel or solid. The porous phase can include or consist of a copolymer and one or more silicon compounds that are each selected from a group consisting of silanes and siloxanes. Suitable siloxanes include, but are not limited to, the polysiloxanes, tetrasiloxanes, trisiloxanes, and disiloxanes disclosed above. The copolymer and the one or more silicon compounds can be microphase separated in the porous phase. The liquid electrolyte can include one or more of the above salts dissolved in a liquid solvent. The liquid solvent can include one or more of the above organic solvents and/or one or more of the above siloxanes and/or one or more of the above silanes.

In some other embodiments, the electrolyte includes an aprotic gel polymer carrier/solvent. Suitable gel polymer carrier/solvents include polyethers, polyethylene oxides, polyimides, polyphosphazines, polyacrylonitriles, polysiloxanes, polyether grafted polysiloxanes, derivatives of the foregoing, copolymers of the foregoing, cross-linked and network structures of the foregoing, blends of the foregoing, and the like, to which is added an appropriate ionic electrolyte salt. Other gel-polymer carrier/solvents include those prepared from polymer matrices derived from polypropylene oxides, polysiloxanes, sulfonated polyimides, perfluorinated membranes (Nafion resins), divinyl polyethylene glycols, polyethylene glycol-bis-(methyl acrylates), polyethylene glycol-bis(methyl methacrylates), derivatives of the foregoing, copolymers of the foregoing, cross-linked and network structures of the foregoing.

In another aspect, an electrochemical device is provided that includes a cathode; an anode; and any of the above electrolytes. The hybrid additive forms a passivation layer on at least one anode and/or one at least one cathode. The hybrid additives of the first and second compounds described above have been found to stabilize the surface of carbonaceous anode and increase the capacity and/or the cycling capabilities of the disclosed batteries. The combination of first and second compound provides for a synergistic effect over the effects of the additives when used singly. Such a hybrid additive forms an SEI with low impedance and offer high rate capability. The electrochemical device may be a lithium secondary battery such as a lithium battery, a lithium-ion battery, a lithium-sulfur battery, a lithium-air battery, a sodium ion battery, or a magnesium battery. The electrochemical device may be a capacitor. For example, the capacitor may be an asymmetric capacitor or supercapacitor. In some embodiments, the electrochemical cell is a primary cell. In some embodiments, the primary cell that is a lithium/$MnO_2$ battery or Li/poly(carbon monofluoride) battery. In some embodiments, the electrochemical cell is a solar cell.

Suitable cathodes include those such as, but not limited to, a lithium metal oxide, spinel, olivine, carbon-coated olivine, $LiFePO_4$, $LiCoO_2$, $LiNiO_2$, $LiNi_{1-x}Co_yMet_zO_2$, $LiMn_{0.5}Ni_{0.5}O_2$, $LiMn_{0.3}Co_{0.3}Ni_{0.3}O_2$, $LiMn_2O_4$, $LiFeO_2$, $Li_{1+x'}Ni_\alpha Mn_\beta Co_\gamma Met'_\delta O_{2-z'}F_{z'}$, $A_n B_2(XO_4)_3$ (NASICON), vanadium oxide, lithium peroxide, sulfur, polysulfide, a lithium carbon monofluoride (also known as LiCFx), or mixtures of any two or more thereof, where Met is Al, Mg, Ti, B, Ga, Si, Mn, or Co; Met' is Mg, Zn, Al, Ga, B, Zr, or Ti; A is Li, Ag, Cu, Na, Mn, Fe, Co, Ni, Cu, or Zn; B is Ti, V, Cr, Fe, or Zr; X is P, S, Si, W, or Mo; $0 \le x \le 0.3$, $0 \le y \le 0.5$, $0 \le z \le 0.5$; $0 \le x' \le 0.4$, $0 \le \alpha \le 1$, $0 \le \beta \le 1$, $0 \le \gamma \le 1$, $0 \le \delta \le 0.4$, and $0 \le z' \le 0.4$; and $0 \le n' \le 3$. According to some embodiments, the spinel is a spinel manganese oxide with the formula of $Li_{1+x}Mn_{2-z}Met'''_yO_{4-m}X'_n$, wherein Met''' is Al, Mg, Ti, B, Ga, Si, Ni, or Co; X' is S or F; and wherein $0 \le x \le 0.3$, $0 \le y \le 0.5$, $0 \le z \le 0.5$, $0 \le m \le 0.5$ and $0 \le n \le 0.5$. In other embodiments, the olivine has a formula of $Li_{1+x}Fe_{1-z}Met''_yPO_{4-m}X'_n$, wherein Met'' is Al, Mg, Ti, B, Ga, Si, Ni, Mn or Co; X' is S or F; and wherein $0 \le x \le 0.3$, $0 \le y \le 0.5$, $0 \le z \le 0.5$, $0 \le m \le 0.5$ and $0 \le n \le 0.5$.

Suitable anodes include those such as lithium metal; graphitic materials, amorphous carbon, $Li_4Ti_5O_{12}$, tin alloys, silicon alloys, intermetallic compounds, or mixtures of any two or more such materials. Suitable graphitic materials including natural graphite, artificial graphite, graphitized meso-carbon microbeads (MCMB), and graphite fibers, as well as any amorphous carbon materials.

The anode and cathode may be separated from each other by a porous separator. The separator for the lithium battery may be a microporous polymer film. Examples of polymers for forming films include: nylon, cellulose, nitrocellulose, polysulfone, polyacrylonitrile, polyvinylidene fluoride, polypropylene, polyethylene, polybutene, or co-polymers or blends of any two or more such polymers. In some instances, the separator is an electron beam treated micro-porous polyolefin separator. The electron treatment can improve the deformation temperature of the separator and can accordingly enhance the high temperature performance of the separator. Additionally, or alternatively, the separator can be a shut-down separator. The shut-down separator can have a trigger temperature above 130° C. to permit the electrochemical cells to operate at temperatures up to 130° C.

Such electrochemical devices and batteries are not limited to particular shapes, and can take any appropriate shape such as cylindrical shape, a coin shape, and a square shape. The batteries also are not limited to particular capacities, and can have any appropriate capacity for both small appliances and power storage or electric cars.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

The use of the terms "a" and "an" and "the" and similar referents in the context of describing the elements (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential to the practice of the invention.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Additionally the phrase "consisting essentially of" will be understood to include those elements specifically recited and those additional elements that do not materially affect the basic and novel characteristics of the claimed invention. The phrase "consisting of" excludes any element not specifically specified. In addition, where features or aspects of the disclosure are described in terms of Markush groups, those skilled in the art will recognize that the disclosure is also thereby described in terms of any individual member or subgroup of members of the Markush group.

One skilled in the art will readily realize that all ranges discussed can and do necessarily also describe all subranges therein for all purposes and that all such subranges also form part and parcel of this invention. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present invention, thus generally described, will be understood more readily by reference to the following examples, which are provided by way of illustration and are not intended to be limiting of the present invention.

EXAMPLES

Example 1

A 2032 coin cell was assembled with a cathode of $LiMn_2O_4$, an anode of massive artificial graphite (MAG), and an electrolyte including 1.0 M $LiPF_6$ in 2-[2-[2-[2-methoxy]ethoxy]ethoxy]ethoxy trimethyl silane (1NM3). The coin cell was cycled at a charging rate of C/10 (0.2 mA), and C/10 for discharge. FIG. 1 is a graph illustrating that the electrolyte is unstable in the cell due to the lack of stable SEI formation.

Example 2

Figure 2:
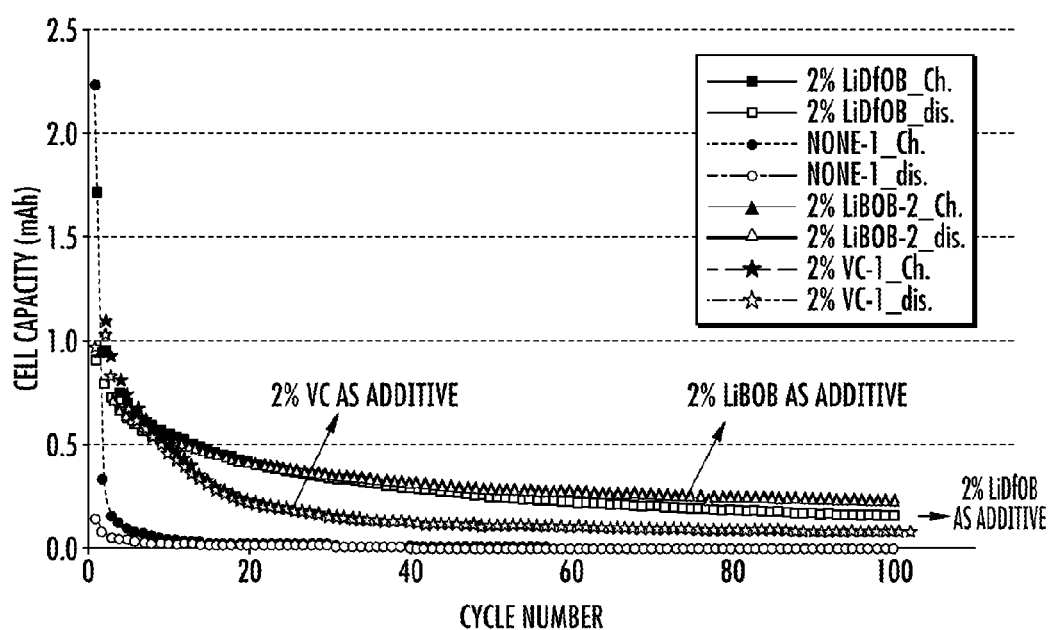
FIG. 2 is a graph of the cycling performance of a 1.0M $LiPF_6$ in 1NM3 with 2 wt % LiBOB, 2 wt % LiDfOB, and 2 wt % vinylcarbonate (VC), according to one example.

A 2032 coin cell was assembled with $LiMn_2O_4$ as cathode, MAG as anode, and an electrolyte including a solvent of 1NM3 with 1.0M $LiPF_6$, and 2 wt % VC, LiBOB, or LiDfOB. The coin cell was cycled at a charging rate of C/10 (0.2 mA), and C/10 for discharge. FIG. 2 illustrates that with a single additive, the silane based electrolyte was unstable in the cell due to the lack of stable SEI formation.

Example 3

Figure 3:
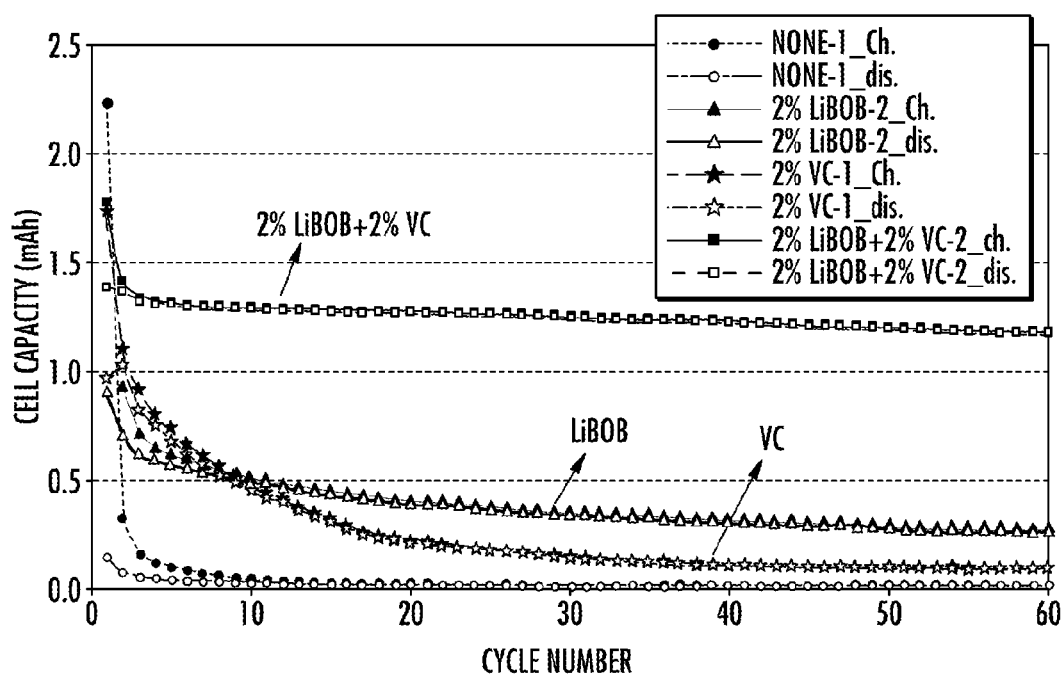
FIG. 3 is a graph of the cycling performance of a 1.0M LiPF$_6$ in 1NM3 with 2 wt % LiBOB and 2 wt % VC, according to one example.

A 2032 coin cell was assembled with $LiMn_2O_4$ as cathode, MAG as anode, and an electrolyte including a solvent of 1NM3 with 1.0M $LiPF_6$, and 2 wt % VC and 2 wt % LiBOB. The coin cell was cycled at a charging rate of C/10 (0.2 mA), and C/10 for discharge. FIG. 3 illustrates that with the hybrid (dual) additive, the silane-based electrolyte forms a very stable SEI on the surface of graphite anode, thereby preventing the reductive decomposition of the silane solvent. Excellent cycling performance was achieved for silane electrolyte with the hybrid additive.

Example 4

Figure 4:
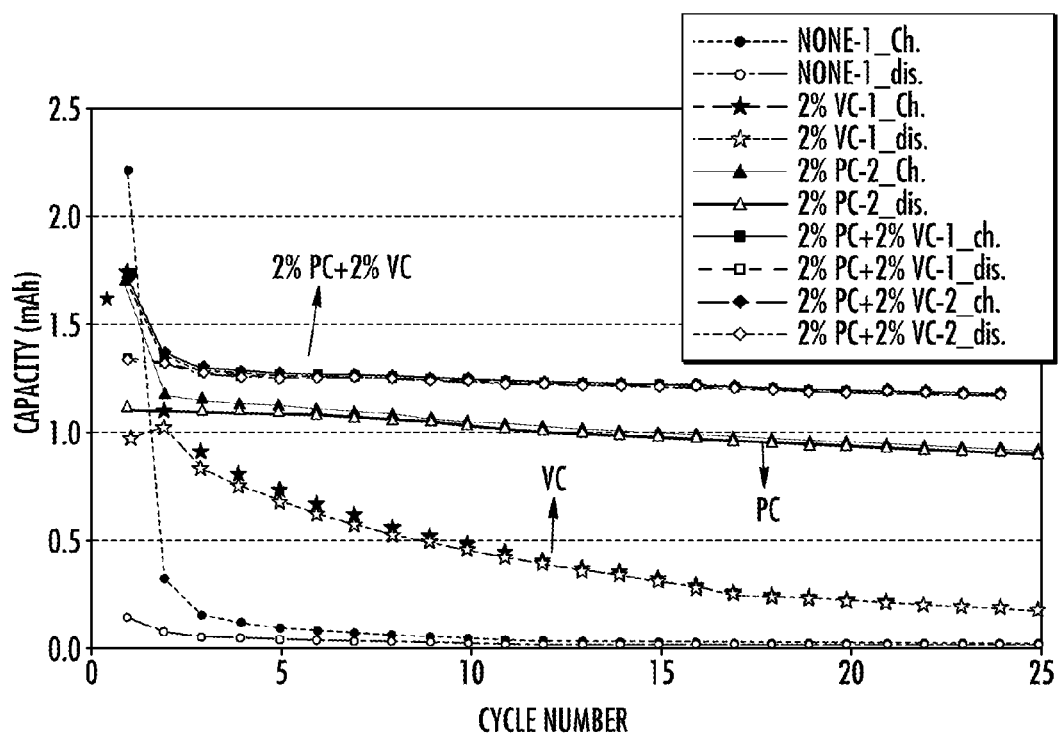
FIG. 4 is a cycling performance of 1.0M LiPF$_6$ in 1NM3 with 2 wt % LiBOB and 2 wt % propylene carbonate (PC), according to one example.

A 2032 coin cell was assembled with $LiMn_2O_4$ as cathode, MAG as anode, and an electrolyte including a solvent of 1NM3 with 1.0M $LiPF_6$, and 2 wt % VC and 2 wt % PC. The coin cell was cycled at a charging rate of C/10 (0.2 mA), and C/10 for discharge. FIG. 4 illustrates that with the hybrid (dual) additive, the silane-based electrolyte forms a very stable SEI on the surface of graphite anode, thereby preventing the reductive decomposition of the silane solvent. Excellent cycling performance was achieved for silane electrolyte with the hybrid additive.

Example 5

Figure 5:
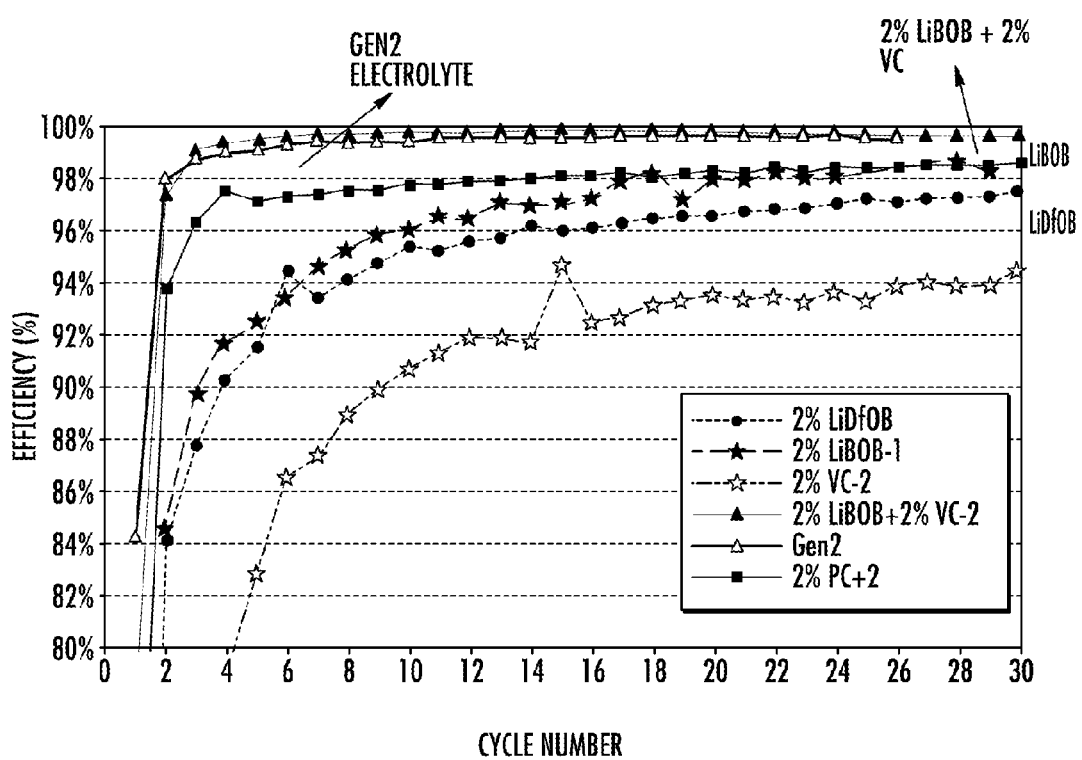
FIG. 5 is columbic efficiency of cell using 1.0M LiPF$_6$ in 1NM3 with 2 wt % LiBOB and 2 wt % vinyl carbonate, according to one example.

A 2032 coin cell was assembled with $LiMn_2O_4$ as cathode, MAG as anode, and an electrolyte including a solvent of 1NM3 with 1.0M $LiPF_6$, and 2 wt % VC and 2 wt % LiBOB. The coin cell was cycled at a charging rate of C/10 (0.2 mA), and C/10 for discharge. FIG. 5 illustrates that a very high Columbic efficiency may be achieved with the hybrid additive. The hybrid (dual) additive, the silane-based electrolyte forms a very stable SEI on the surface of graphite anode, thereby preventing the reductive decomposition of the silane solvent. Excellent cycling performance was achieved for silane electrolyte with the hybrid additive. FIG. 5 also illustrates the difference between single additive electrolytes and the hybrid additive electrolyte. For example, with either 2 wt % VC or 2 wt % LiBOB, alone, the efficiency is low, however when both 2 wt % VC and 2 wt % LiBOB are used, the efficiency is very high (>99%). This is a surprising finding.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An electrochemical device comprising:
   an anodic material; and
   an electrolyte, the electrolyte comprising:
   a hybrid additive comprising a first compound and propylene carbonate, the hybrid additive configured to form a solid electrolyte interphase film on the anodic material upon application of a potential to the electrochemical device;
   a salt comprising LiBr, LiI, LiSCN, LiBF$_4$, LiAlF$_4$, LiPF$_6$, LiAsF$_6$, LiClO$_4$, Li$_2$SO$_4$, LiB(Ph)$_4$, LiAlO$_2$, Li[N(FSO$_2$)$_2$], Li[SO$_3$CH$_3$], Li[BF$_3$(C$_2$F$_5$)], Li[PF$_3$(CF$_2$CF$_3$)$_3$], Li[B(C$_2$O$_4$)$_2$], Li[B(C$_2$O$_4$)F$_2$], Li[PF$_4$(C$_2$O$_4$)], Li[PF$_2$(C$_2$O$_4$)$_2$], Li[CF$_3$CO$_2$], Li[C$_2$F$_5$CO$_2$], Li[N(CF$_3$SO$_2$)$_2$], Li[C(SO$_2$CF$_3$)$_3$], Li[N(C$_2$F$_5$SO$_2$)$_2$], Li[CF$_3$SO$_3$], Li$_2$B$_{12}$X$_{12-n}$H$_n$, Li$_2$B$_{10}$X$_{10-n'}$H$_{n'}$, Li$_2$S$_{x''}$, (LiS$_{x''}$R$^1$)$_y$, (LiSe$_{x''}$R$^1$)$_{y'}$, or lithium alkyl fluorophosphates; where X is a halogen, n is an integer from 0 to 12, n' is an integer from 0 to 10, x'' is an integer from 1 to 20, y is an integer from 1 to 3, and R$^1$ is H, alkyl, alkenyl, aryl, ether, F, CF$_3$, COCF$_3$, SO$_2$CF$_3$, or SO$_2$F; and
   a non-aqueous solvent comprising Si(CH$_3$)$_3$O(CH$_2$CH$_2$O)$_n$CH$_3$, Si(CH$_3$)$_3$CH$_2$O(CH$_2$CH$_2$O)$_n$CH$_3$, Si(CH$_3$)$_3$(CH$_2$)$_3$O(CH$_2$CH$_2$O)$_n$CH$_3$, Si(CH$_3$)$_2$[O(CH$_2$CH$_2$O)$_n$CH$_3$]$_2$, CH$_3$Si[O(CH$_2$CH$_2$O)$_p$CH$_3$]$_3$, Si[O(CH$_2$CH$_2$O)$_p$CH$_3$]$_4$, Si(CH$_3$)$_2$[O(CH$_2$CH$_2$O)$_n$CH$_3$][(CH$_2$)$_3$O(CH$_2$CH$_2$O)$_n$CH$_3$], (CH$_3$)$_3$SiOR, or (CH$_3$)$_3$Si(CH$_2$)$_3$OR;
   wherein:
   R is a carbonate group;
   n is 2, 3, 4, 5, 6, or 7;
   n' is 2, 3, 4, or 5;
   p is 2, 3, or 4; and
   p' is 2 or 3;
   wherein:
   the electrolyte comprises about 1 wt % to about 3 wt % of the first compound;
   the electrolyte comprises about 1 wt % to about 3 wt % of the propylene carbonate;
   the first compound is represented by Formula I-B:

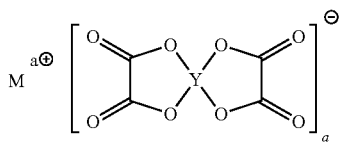

IB

M is a metal ion, an ammonium, a phosphonium, a sulfonium, an imidazolium, a pyridinium, or trityl;
a is 1, 2, 3, or 4; and
Y is B.

2. The electrochemical device of claim 1, wherein the electrolyte comprises about 2 wt % of the first compound, and about 2 wt % of the second compound.

3. The electrochemical device of claim 1, wherein M is Li$^+$, Na$^+$, or K$^+$.

4. The electrochemical device of claim 1, wherein the anode comprises graphite, amorphous carbon, Li$_4$Ti$_5$O$_{12}$, a tin alloy, a silicon alloy, an intermetallic compound, or lithium metal.

5. The electrochemical device of claim 1 further comprising a separator.

6. A non-aqueous electrolyte comprising:
   a first compound; a second compound;
   a salt comprising LiBr, LiI, LiSCN, LiBF$_4$, LiAlF$_4$, LiPF$_6$, LiAsF$_6$, LiClO$_4$, Li$_2$SO$_4$, LiB(Ph)$_4$, LiAlO$_2$, Li[N(FSO$_2$)$_2$], Li[SO$_3$CH$_3$], Li[BF$_3$(C$_2$F$_5$)], Li[PF$_3$(CF$_2$CF$_3$)$_3$], Li[B(C$_2$O$_4$)F$_2$], Li[PF$_4$(C$_2$O$_4$)], Li[PF$_2$(C$_2$O$_4$)$_2$], Li[CF$_3$CO$_2$], Li[C$_2$F$_5$CO$_2$], Li[N(CF$_3$SO$_2$)$_2$], Li[C(SO$_2$CF$_3$)$_3$], Li[N(C$_2$F$_5$SO$_2$)$_2$], Li[CF$_3$SO$_3$], Li$_2$B$_{12}$X$_{12-n}$H$_n$, Li$_2$B$_{10}$X$_{10-n'}$H$_{n'}$, Li$_2$S$_{x''}$, (LiS$_{x''}$R$^1$)$_y$, (LiSe$_{x''}$R$^1$)$_{y'}$, or lithium alkyl fluorophosphates; where X is a halogen, n is an integer from 0 to 12, n' is an integer from 0 to 10, x'' is an integer from 1 to 20, y is an integer from 1 to 3, and R$^1$ is H, alkyl, alkenyl, aryl, ether, F, CF$_3$, COCF$_3$, SO$_2$CF$_3$, or SO$_2$F; and
   a non-aqueous solvent comprising Si(CH$_3$)$_3$O(CH$_2$CH$_2$O)$_n$CH$_3$, Si(CH$_3$)$_3$CH$_2$O(CH$_2$CH$_2$O)$_n$CH$_3$, Si(CH$_3$)$_3$(CH$_2$)$_3$O(CH$_2$CH$_2$O)$_n$CH$_3$, Si(CH$_3$)$_2$[O(CH$_2$CH$_2$O)$_n$CH$_3$]$_2$, Si CH$_3$[O(CH$_2$CH$_2$O)$_p$CH$_3$]$_3$, Si[O(CH$_2$CH$_2$O)$_p$CH$_3$]$_4$, Si(CH$_3$)$_2$[O(CH$_2$CH$_2$O)$_n$CH$_3$][(CH$_2$)$_3$O(CH$_2$CH$_2$O)$_n$CH$_3$], (CH$_3$)$_3$SiOR, or (CH$_3$)$_3$Si(CH$_2$)$_3$OR;
   wherein:
   R is a carbonate group;
   n is 2, 3, 4, 5, 6, or 7;
   n' is 2, 3, 4, or 5;
   p is 2, 3, or 4; and
   p' is 2 or 3;
   wherein:
   the electrolyte comprises about 1 wt % to about 3 wt % of the first compound;
   the electrolyte comprises about 1 wt % to about 3 wt % of the second compound;
   the first compound is represented by Formula I-B:

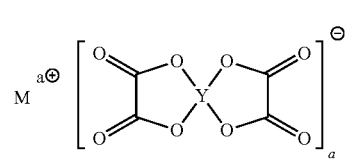

IB the second compound is propylene carbonate;
M is a metal ion, an ammonium, a phosphonium, a sulfonium, an imidazolium, a pyridinium, or trityl;
a is 1, 2, 3, or 4; and
Y is B.

7. The non-aqueous electrolyte of claim 6, wherein the electrolyte comprises about 2 wt % of the first compound, and about 2 wt % of the second compound.

* * * * *